(12) United States Patent
Godfrey et al.

(10) Patent No.: US 10,155,163 B2
(45) Date of Patent: *Dec. 18, 2018

(54) METHODS, SYSTEMS, AND PRODUCTS FOR CONTROL OF GAMING APPLICATIONS

(71) Applicant: Red Hat, Inc., Raleigh, NC (US)

(72) Inventors: Jason Godfrey, Volcano, CA (US); Toby Bearden, McKinney, TX (US); Michele L. Smith, Larkspur, CO (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/798,942

(22) Filed: Oct. 31, 2017

(65) Prior Publication Data

US 2018/0056185 A1  Mar. 1, 2018

Related U.S. Application Data

(63) Continuation of application No. 15/268,540, filed on Sep. 17, 2016, now Pat. No. 9,839,847, which is a
(Continued)

(51) Int. Cl.
| | |
|---|---|
| *A63F 13/493* | (2014.01) |
| *A63F 13/79* | (2014.01) |
| *A63F 13/77* | (2014.01) |
| *H04L 29/06* | (2006.01) |
| *A63F 13/30* | (2014.01) |
| *A63F 13/25* | (2014.01) |

(Continued)

(52) U.S. Cl.
CPC ............ *A63F 13/493* (2014.09); *A63F 13/12* (2013.01); *A63F 13/25* (2014.09); *A63F 13/335* (2014.09); *A63F 13/35* (2014.09); *A63F 13/77* (2014.09); *A63F 13/79* (2014.09); *H04L 67/38* (2013.01); *A63F 2300/554* (2013.01); *A63F 2300/5533* (2013.01); *A63F 2300/5546* (2013.01)

(58) Field of Classification Search
USPC ....................................... 463/24, 43
See application file for complete search history.

(56) References Cited

U.S. PATENT DOCUMENTS

| | | | |
|---|---|---|---|
| 5,904,620 A | 5/1999 | Kujawa | |
| 8,056,113 B2 | 11/2011 | Balasubramanian et al. | |

(Continued)

FOREIGN PATENT DOCUMENTS

| | | |
|---|---|---|
| WO | 2011091296 A1 | 7/2011 |
| WO | 2013137644 A1 | 9/2013 |

OTHER PUBLICATIONS

Author Unknown, "Frequently Asked Questions about Amazon Kindle," web.archive.org/web/20071122184806/http:/www.amazon.com/gp/help/customer/display.html?nodeId=200127480&#whispernet, Wayback Machine, Nov. 22, 2007, Amazon.com, Inc., 12 pages.

(Continued)

*Primary Examiner* — Pierre E Elisca
(74) *Attorney, Agent, or Firm* — Red Hat, Inc.

(57) ABSTRACT

Methods, systems, and products bookmark gaming applications. When a player wishes to pause a gaming application, a bookmark may be created. The bookmark identifies a location in the gaming application at which play is paused. Play may then be resumed from the bookmark, whether at a same device or at a different device.

20 Claims, 19 Drawing Sheets

Related U.S. Application Data continuation of application No. 14/334,769, filed on Jul. 18, 2014, now Pat. No. 9,463,384, which is a continuation of application No. 13/469,144, filed on May 11, 2012, now Pat. No. 8,801,523, which is a continuation of application No. 12/609,073, filed on Oct. 30, 2009, now Pat. No. 8,197,345.

(51) Int. Cl.
*A63F 13/335* (2014.01)
*A63F 13/35* (2014.01)

(56) References Cited

U.S. PATENT DOCUMENTS

| | | | |
|---|---|---|---|
| 8,197,345 B2 | 6/2012 | Godfrey et al. | |
| 8,516,529 B2 | 8/2013 | Lajoie et al. | |
| 8,591,339 B2 | 11/2013 | Santhosh | |
| 8,606,948 B2 | 12/2013 | Evans et al. | |
| 8,650,307 B2 | 2/2014 | Miller | |
| 8,747,232 B1 | 6/2014 | Quan et al. | |
| 8,801,523 B2 | 8/2014 | Godfrey et al. | |
| 9,463,384 B2 | 10/2016 | Godfrey et al. | |
| 2004/0024928 A1 | 2/2004 | Billington et al. | |
| 2006/0035711 A1 | 2/2006 | Samuels | |
| 2006/0148568 A1 | 7/2006 | Schultz et al. | |
| 2006/0153050 A1* | 7/2006 | Mijiritskii | G11B 7/24038 369/275.1 |
| 2007/0010323 A1 | 1/2007 | Azulai et al. | |
| 2007/0021216 A1 | 1/2007 | Guruparan | |
| 2007/0026945 A1 | 2/2007 | Nguyen | |
| 2007/0060363 A1 | 3/2007 | Nguyen et al. | |
| 2007/0124331 A1 | 5/2007 | Griffin | |
| 2009/0043896 A1 | 2/2009 | Law | |
| 2009/0149250 A1* | 6/2009 | Middleton | A63F 13/12 463/31 |
| 2009/0203431 A1 | 8/2009 | Bernesi | |
| 2009/0228936 A1 | 9/2009 | Davis et al. | |
| 2009/0259711 A1 | 10/2009 | Drieu et al. | |
| 2010/0027966 A1 | 2/2010 | Harrang et al. | |
| 2010/0081375 A1* | 4/2010 | Rosenblatt | G08C 17/02 455/41.1 |
| 2010/0146567 A1 | 6/2010 | Mehta et al. | |
| 2011/0105232 A1 | 5/2011 | Godfrey et al. | |
| 2012/0079523 A1 | 3/2012 | Trimper et al. | |
| 2012/0231875 A1 | 9/2012 | Godfrey et al. | |
| 2013/0127980 A1* | 5/2013 | Haddick | G06F 3/013 348/14.08 |
| 2013/0205206 A1 | 8/2013 | Hawver et al. | |
| 2013/0278631 A1* | 10/2013 | Border | G02B 27/017 345/633 |
| 2014/0329580 A1 | 11/2014 | Godfrey et al. | |
| 2017/0001117 A1 | 1/2017 | Godfrey et al. | |

OTHER PUBLICATIONS

Breckon, Nick, et al., "Valve Announces Steam Cloud; Online Network to Store Saved Games Indefinitely," www.shacknews.com/article/52906/valve-announces-steam-cloud-online, May 2008, Shacknews LTD., 5 pages.

Author Unknown, "Descent (video game)," Wikipedia article, en.wikipedia.org/w/index.php?title=Descent_(video_game)&oldid=737183729, accessed Sep. 1, 2016, 12 pages.

Non-Final Office Action for U.S. Appl. No. 12/609,073, dated Sep. 29, 2011, 6 pages.

Notice of Allowance for U.S. Appl. No. 12/609,073, dated Mar. 30, 2012, 7 pages.

Non-Final Office Action for U.S. Appl. No. 13/469,144, dated Feb. 5, 2013, 6 pages.

Non-Final Office Action for U.S. Appl. No. 13/469,144, dated Jul. 17, 2013, 8 pages.

Final Office Action for U.S. Appl. No. 13/469,144, dated Jan. 6, 2014, 9 pages.

Notice of Allowance for U.S. Appl. No. 13/469,144, dated May 12, 2014, 7 pages.

Non-Final Office Action for U.S. Appl. No. 15/268,540, dated Dec. 1, 2016, 9 pages.

Ex Parte Quayle Action for U.S. Appl. No. 15/268,540, mailed May 12, 2017, 5 pages.

Notice of Allowance for U.S. Appl. No. 15/268,540, dated Aug. 9, 2017, 8 pages.

Non-Final Office Action for U.S. Appl. No. 14/334,769, dated Dec. 4, 2015, 9 pages.

Notice of Allowance for U.S. Appl. No. 14/334,769, dated Jun. 15, 2016, 8 pages.

\* cited by examiner

METHODS, SYSTEMS, AND PRODUCTS FOR CONTROL OF GAMING APPLICATIONS

CROSS-REFERENCE TO RELATED APPLICATIONS

This application is a continuation of U.S. application Ser. No. 15/268,540 filed Sep. 17, 2016, which is a continuation of U.S. application Ser. No. 14/334,769 filed Jul. 18, 2014 and since issued as U.S. Pat. No. 9,463,384, which is a continuation of U.S. application Ser. No. 13/469,144 filed May 11, 2012 and since issued as U.S. Pat. No. 8,801,523, which is a continuation of U.S. application Ser. No. 12/609,073 filed Oct. 30, 2009 and since issued as U.S. Pat. No. 8,197,345, with all applications incorporated herein by reference in their entireties.

BACKGROUND

Exemplary embodiments generally relate to amusement and gaming devices and, more particularly, to video games, to player-actuated controls, and to data storage and retrieval.

Electronic gaming is enjoyed by many people. Electronic games may be played on computers, phones, and even dedicated gaming consoles. Thousands of electronic games are available for individual and group play. Even though electronic gaming is ubiquitous, improvements are needed.

SUMMARY

Exemplary embodiments provide methods, systems, and products for controlling electronic games. Exemplary embodiments describe a centralized gaming center that allows players to pause and resume play of electronic games. That is, one or more players may enjoy an electronic game and then "pause" the game for later enjoyment. When any of the players is ready to resume play, the player's gaming device merely requests a summary of the paused electronic game. The summary describes the players' usernames, their respective scores, and bookmarks to their respective logical locations in the electronic game. Each player may then resume play of the electronic game, even hours or days later, from the same point at which play was paused. Exemplary embodiments even permit resumption of play at different gaming devices, from any location in the world. Electronic games may thus be paused and resumed, without lugging the same gaming device to different locations. Games may be played, paused, and resumed without concern for hardware compatibility.

Exemplary embodiments will be or become apparent to one with ordinary skill in the art upon review of the following drawings and detailed description. It is intended that all such additional systems, methods, and/or computer program products be included within this description, be within the scope of the claims, and be protected by the accompanying claims.

BRIEF DESCRIPTION OF THE SEVERAL VIEWS OF THE DRAWINGS

These and other features, aspects, and advantages of the exemplary embodiments are better understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
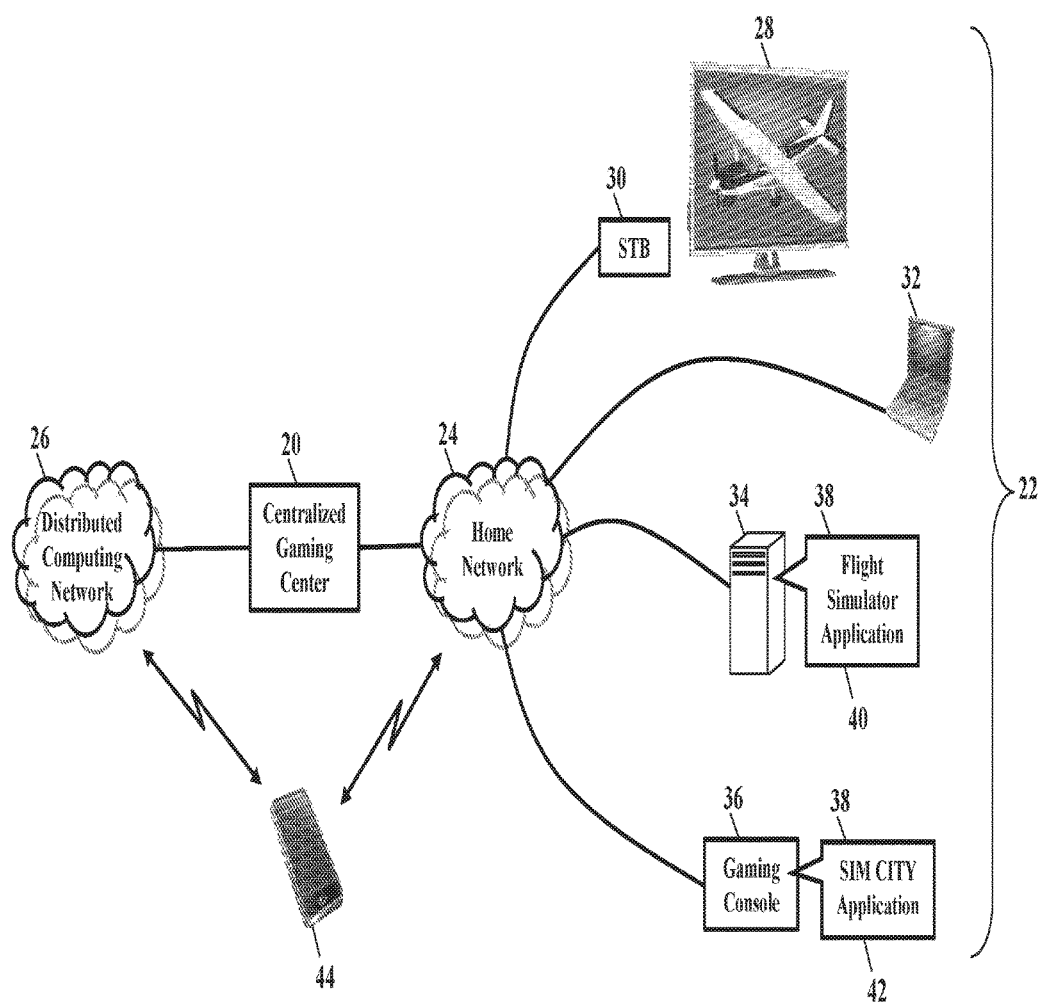
FIG. 1 is a simplified schematic illustrating an environment in which exemplary embodiments may be implemented.

FIG. 1 is a simplified schematic illustrating an environment in which exemplary embodiments may be implemented. A centralized gaming center 20 communicates with multiple gaming devices 22 via a home communications network 24. As electronic games are played on the gaming devices 22, each gaming device 22 communicates with, and reports to, the centralized gaming center 20. The centralized gaming center 20 functions as a centralized control unit that ties all gaming platforms and sources together, regardless of manufacturer, game, or gaming device. Results, scores, players, and other gaming information are stored in the centralized gaming center 20, thus allowing any game to be played, saved, or resumed from any gaming device 22 on the home communications network 24. The centralized gaming center 20 may even be remotely accessed via a distributed computing network 26 (such as the Internet), thus allowing games to be played, or resumed, from any networked location.

FIG. 1 illustrates diverse control of the different gaming devices 22. The centralized gaming center 20 may access the home communications network 24. A monitor 28 and a set top box ("STB") 30 may communicate with the home communications network 24. A mobile laptop computer 32, a personal desktop computer 34, and a gaming console 36 may also communicate with the home communications network 24 and, thus, with the centralized gaming center 20. Gaming applications 38 may be hosted on any of the gaming devices 22, but the gaming applications 38 may be played and enjoyed from any gaming device 22 that communicates with the centralized gaming center 20. A user, for example, may enjoy a flight simulator on the large screen monitor 28 in the family room, even though the flight simulator application 40 is hosted and executed by the personal desktop computer 34 in a home office. The game SIM CITY® may be played on the laptop computer 32 from the kitchen, even though the SIM CITY® gaming application 42 is hosted and executed on the gaming console 36 (such as a NINTENDO® entertainment system) in a separate game room or closet. The flight simulator application 40, the game SIM CITY® application 42, or any other gaming application 38 may be a shared experience with other users in other rooms or other remote locations, through the control of the centralized gaming center 20. A mobile phone 44 may even access the centralized gaming center 20, either from the home communications network 24 and/or the distributed computing network 26, to save, pause, and participate in any gaming application 38.

Figure 2:
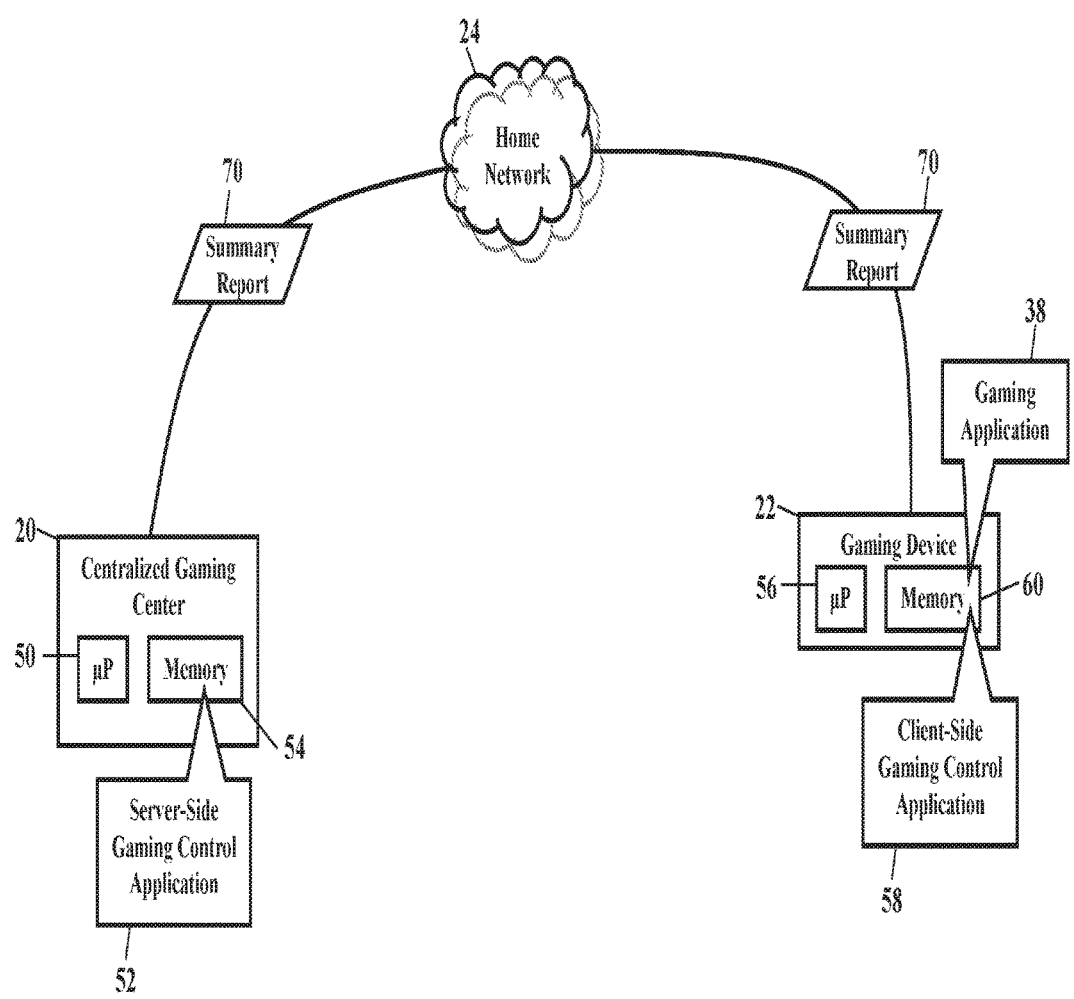
FIGS. 2 and 3 are more detailed schematics illustrating the centralized gaming center, according to exemplary embodiments.
Figure 3:
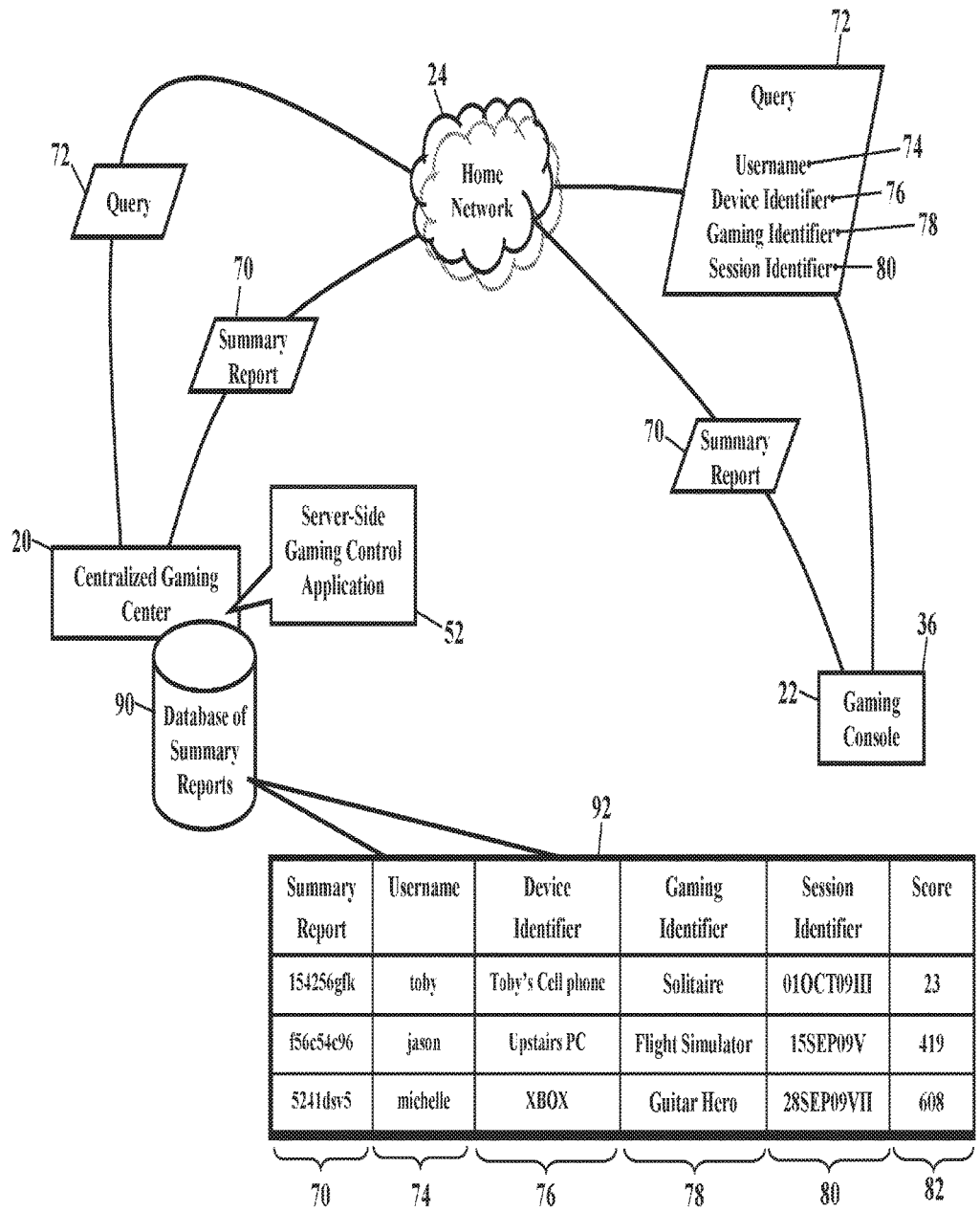

FIGS. 2 and 3 are more detailed schematics illustrating the centralized gaming center 20, according to exemplary embodiments. The centralized gaming center 20 has a processor 50 (e.g., "µP"), application specific integrated circuit (ASIC), or other component that executes a server-side gaming control application 52 stored in a memory 54. Each gaming device 22 may also have a processor 56 (e.g., "µP"), application specific integrated circuit (ASIC), or other component that executes a client-side gaming control application 58 stored in a memory 60. The server-side gaming control application 52, and each client-side gaming control application 58, cooperate to share and/or report a summary report 70 of each gaming application 38 being played on the gaming device 22. That is, as each gaming device 22 executes the gaming application 38, each client-side gaming control application 58 sends the summary report 70 to the centralized gaming center 20. Each summary report 70 may be periodically and/or randomly reported and stored in the memory 54 of the centralized gaming center 20. Each summary report 70 may additionally or alternatively reported at defined points in each gaming application 38, such as when a particular strategic, tactical, or procedural objective or milestone is achieved. Regardless, each summary report 70 may describe or detail a current or final result, player names, each player's score, and any other gaming information. Each summary report 70 communicates over the home communications network 24 to the centralized gaming center 20.

FIG. 3 illustrates retrieval of summary reports. Each summary report 70 may also be retrieved from the centralized gaming center 20. Any user, at any gaming device 22 (illustrated in FIG. 1), may send a query 72 to retrieve any summary report 70 from the memory 54 of the centralized gaming center 20. FIG. 3, for simplicity, illustrates the query 72 originating from the gaming console 36, but the query 72 may be sent from any other gaming device (illustrated as reference numeral 22 in FIG. 1). The query 72 may include parameters, data, and or fields that identify the desired summary report. The query 72, for example, may include one or more usernames 74, a device identifier 76, a gaming identifier 78, and/or a session identifier 80. Each username 74 may be any alphanumeric combination that identifies a player of a game. The device identifier 76 may be any alphanumeric combination that identifies one of the gaming devices 22. The device identifier 76, for example, may be a serial number of the gaming device 22, a manufacturer's model number, and/or a machine moniker (e.g., "Michelle's computer," "Jason's cell phone," or "Toby's XBOX"). The gaming identifier 78 may be any alphanumeric combination that identifies the gaming application for which the summary report 70 is desired, such as a game title, version number, serial number, or some other identifying information. The session identifier 80 may be any alphanumeric combination that also helps identify the gaming application. The session identifier 80 may be helpful when the same gaming application is played multiple times by the same user or group of users, and a particular summary report 70 is desired. Any current or final score 82, associated with one or more of the usernames 74, may also be logged.

The corresponding summary report 70 is retrieved. When the centralized gaming center 20 receives the query 72, the server-side gaming control application 52 obtains or retrieves the one or more usernames 74, the device identifier 76, the gaming identifier 78, and/or the session identifier 80. The server-side gaming control application 52 queries a database 90 of summary reports for the one or more usernames 74, the device identifier 76, the gaming identifier 78, and/or the session identifier 80. The database 90 of summary reports may be locally stored in the memory 54 of the centralized gaming center 20, but the database 90 of summary reports may be remotely stored and accessed via the home communications network and/or the distributed computing network (illustrated, respectively, as reference numerals 24 and 26 in FIG. 1). The database 90 of summary reports is illustrated as table 92 that maps, relates, or associates the summary report 70 to usernames 74, device identifiers 76, gaming identifiers 78, and/or the session identifiers 80. The server-side gaming control application 52 retrieves the summary report 70 from the database 90 of summary reports that is associated with one or more of the parameters in the query 72. The server-side gaming control application 52 then instructs the centralized gaming center 20 to send the summary report 70 as a response to the query 72. The desired summary report 70 routes along the home communications network 24 (and/or the distributed computing network 26) to the address associated with the originating device (e.g., the gaming console 36).

Figure 4:
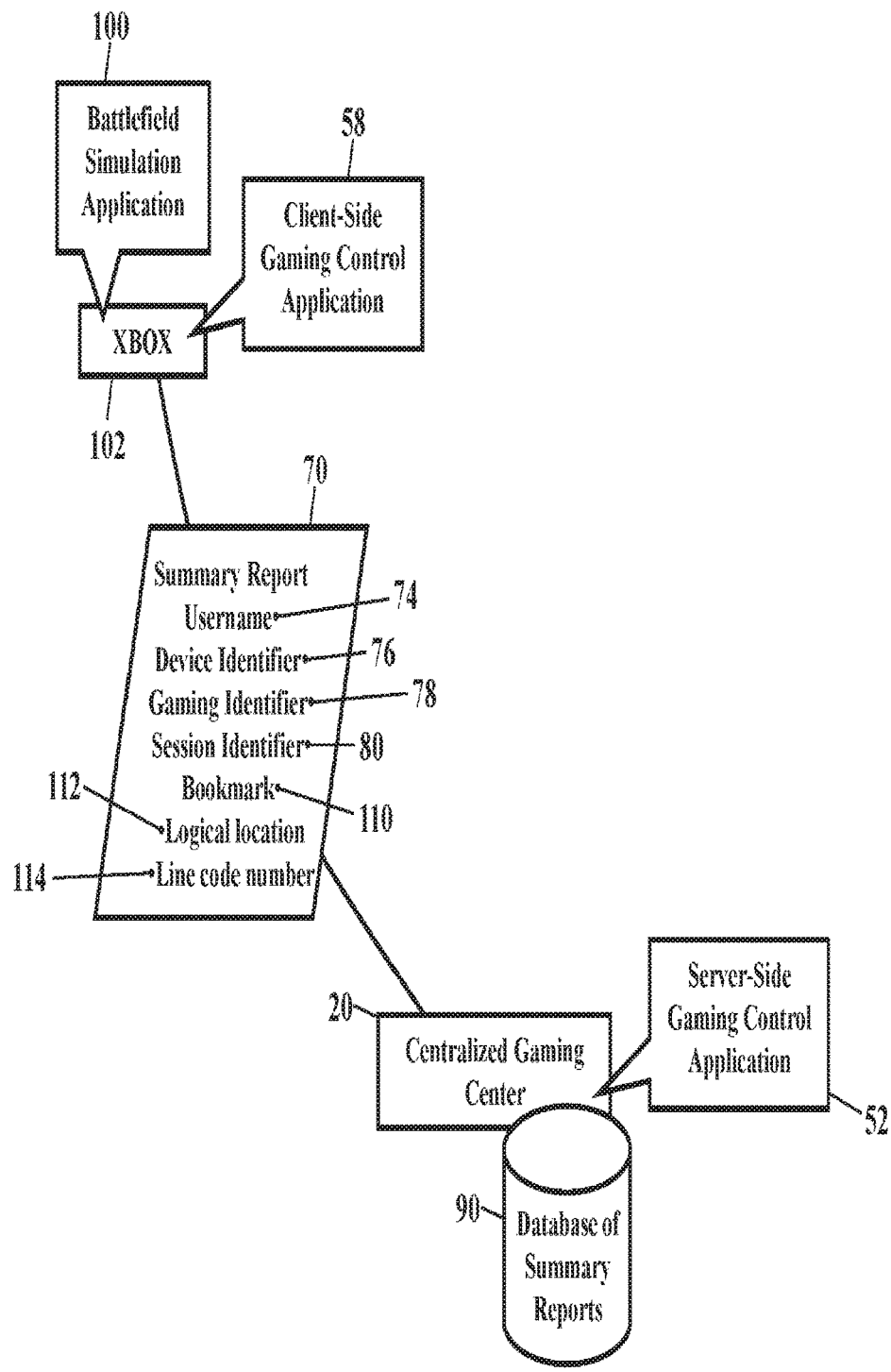
FIGS. 4-6 are schematics illustrating resumption of games, according to exemplary embodiments.
Figure 5:
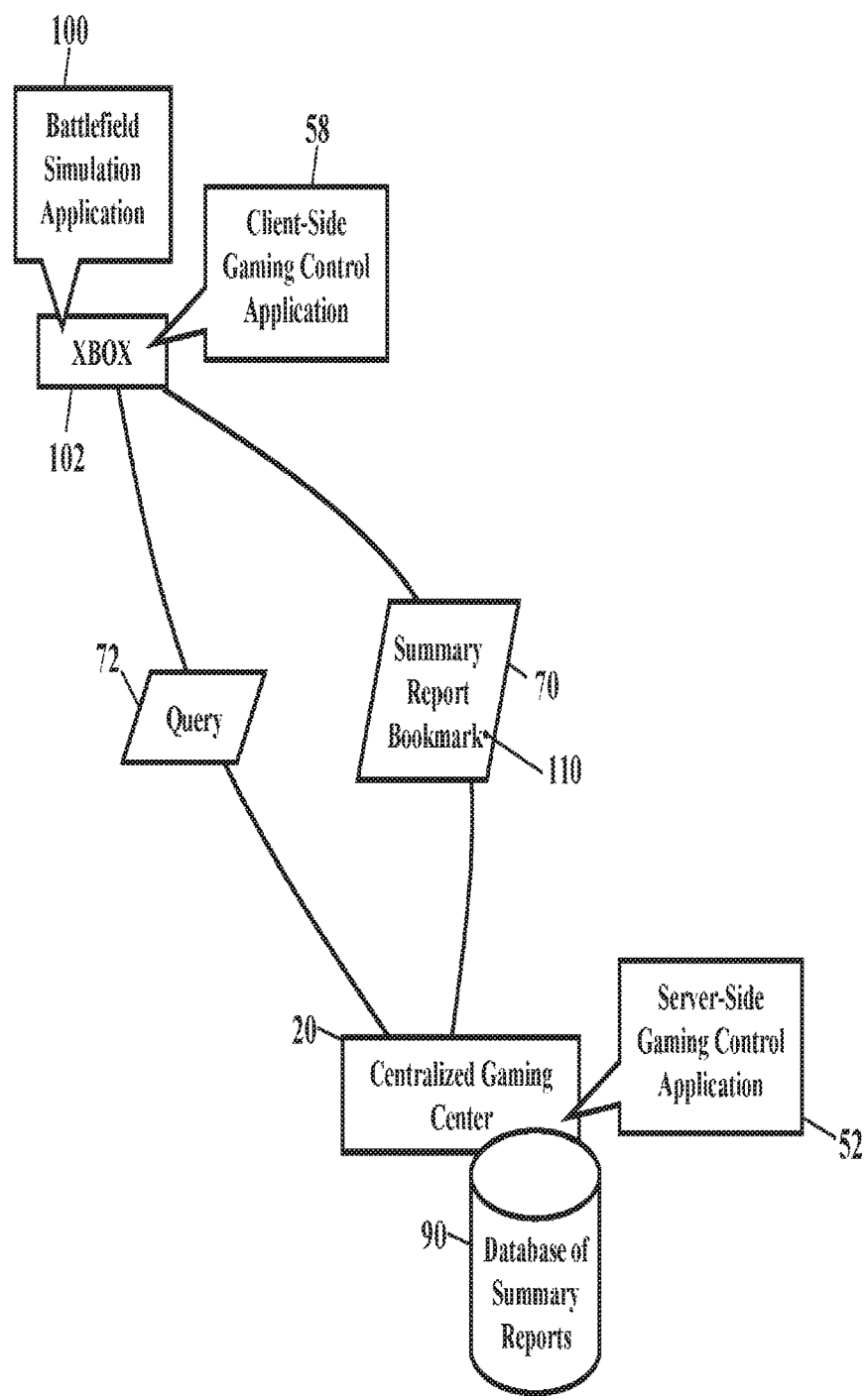
Figure 6:
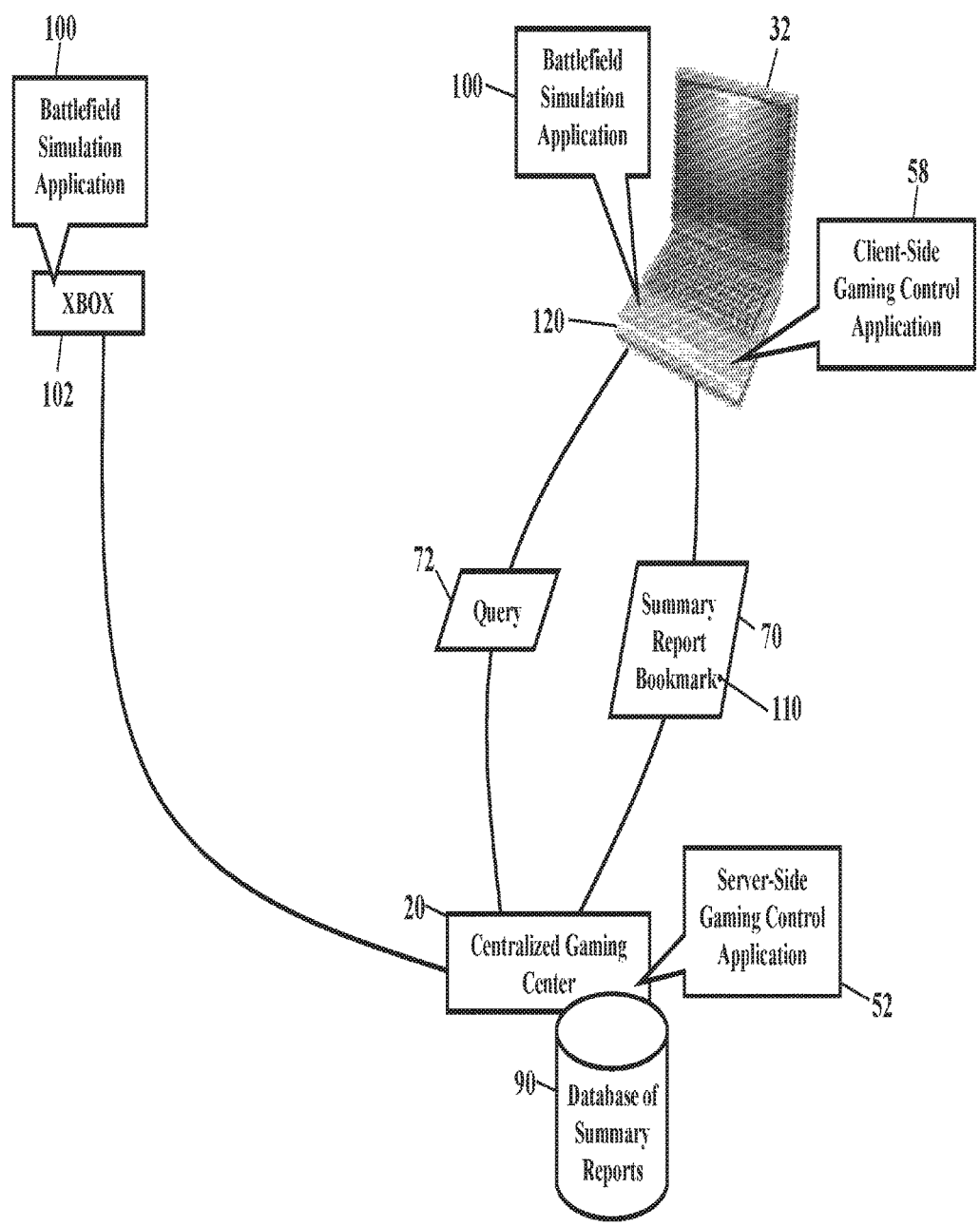

FIGS. 4-6 are schematics illustrating resumption of games, according to exemplary embodiments. FIG. 4 illustrates how any gaming application 38 may be paused at one gaming device, and the gaming application may be resumed at the same or at a different gaming device. Assume a user begins playing a battlefield simulation application 100 on a first gaming device 102 (illustrated as a MICROSOFT® XBOX®). The user later decides to pause the battlefield simulation application 100 and to resume play at a later time. When the user selects a "pause play" icon, command, or control button on a user interface, the user's first gaming device 102 executes the client-side gaming control application 58. The client-side gaming control application 58 sends the summary report 70 to the centralized gaming center 20. The summary report 70 may include the player's username 74, the gaming identifier 78, and/or the device identifier 76 associated with the first gaming device 22 (the MICROSOFT® XBOX®) on which the game was originally or recently played. The summary report 70 may also include the session identifier 80 when the same battlefield simulation application 100 has been recently played by the same username 74.

The summary report 70 may also include a bookmark 110. The bookmark 110 describes the logical location 112 in the battlefield simulation application 100 at which the player wishes to pause play. The bookmark 110, for example, may describe a line code number 114 that identifies a line in the software code of the battlefield simulation application 100 at which the player wishes to pause play. Each line of software code in the battlefield simulation application 100 may have a unique number. When the user pauses play, the client-side gaming control application 58 retrieves the line code number 114 in the software code of the battlefield simulation application 100 at which the player wishes to pause play. The client-side gaming control application 58 may add the line code number 114 to the summary report 70 and send the summary report 70 to the centralized gaming center 20.

The bookmark 110 is unlike a time stamp. Some gaming applications may track or time a player's usage of a gaming application. A time stamp, though, may not accurately reflect the player's logical position in the gaming application. Many gaming applications, for example, have a repetitive or recursive routine that a player must master before moving to a next level. A player may spend several minutes, or even hours, mastering the routine. A time stamp, then may not accurately reflect the player's position in the game. The bookmark 110, however, returns the player to the logical location 112 at which play was paused, regardless of the elapsed time playing the game.

The summary report 70 is stored for retrieval. When the centralized gaming center 20 receives the summary report 70, the server-side gaming control application 52 stores the summary report 70 in the database 90 of summary reports. The server-side gaming control application 52 also associates the summary report 70 to one or more query terms, such as the one or more usernames 74, the device identifier 76, the gaming identifier 78, and/or the session identifier 80.

FIG. 5 illustrates resumption of play on the same gaming device (e.g., the MICROSOFT® XBOX®). When the user decides to resume play of the battlefield simulation application 100, the battlefield simulation application 100 may be resumed from the bookmark 110. As FIG. 5 illustrates, the user instructs the client-side gaming control application 58 to retrieve the summary report 70 associated with paused battlefield simulation application 100. The client-side gaming control application 58, operating in the first gaming device 102, sends the query 72 to the centralized gaming center 20. The query 72 includes information associated with the paused battlefield simulation application 100 (such as the one or more usernames 74, device identifier 76, gaming identifier 78, and/or session identifier 80 illustrated in FIG. 3). When the centralized gaming center 20 receives the query 72, the server-side gaming control application 52 queries the database 90 of summary reports for the summary report 70 associated with the username 74, the device identifier 76, the gaming identifier 78, and/or the session identifier 80. The server-side gaming control application 52 retrieves the corresponding summary report 70 and sends the summary report 70 to a network address associated with the first gaming device 102 (e.g., the MICROSOFT® XBOX®). The client-side gaming control application 58, operating in the MICROSOFT® XBOX®, reads the summary report 70 to obtain the username(s), score(s), and other details of the paused battlefield simulation application 100. Moreover, the client-side gaming control application 58 obtains or retrieves the bookmark 110 identifying the logical location 112 in the battlefield simulation application 100 at which play was previously paused. The client-side gaming control application 58 then instructs the first gaming device 102 (e.g., the MICROSOFT® XBOX®) to resume executing the battlefield simulation application 100 from the bookmark 110. The client-side gaming control application 58 may also instruct the first gaming device 102 to resume scoring from the previous tally or score(s) contained in the summary report 70 for each username 74 (as illustrated in FIG. 3).

As FIG. 6, however, illustrates how play may be resumed from different devices. Even though play may have begun on the first gaming device 102, exemplary embodiments permit resumption of play on a different gaming device. After the user pauses the battlefield simulation application 100 at the first gaming device 102 (e.g., the MICROSOFT® XBOX®), the user may wish to resume the battlefield simulation application 100 at a different, second gaming device 120 (illustrated as laptop computer 32). In FIG. 6, then, the user wishes to resume play of the battlefield simulation application 100 from the laptop computer 32. The user instructs the client-side gaming control application 58, operating in the laptop computer 32, to retrieve the summary report 70 associated with paused battlefield simulation application 100. The client-side gaming control application 58, operating in the laptop computer 32, sends the query 72 to the centralized gaming center 20. When the centralized gaming center 20 receives the query 72, the server-side gaming control application 52 queries the database 90 of summary reports for the summary report 70 associated with the username 74, the device identifier 76, the gaming identifier 78, and/or the session identifier 80 (as FIG. 3 illustrated). The server-side gaming control application 52 retrieves the corresponding summary report 70 and sends the summary report 70 to the network address associated with the different, second gaming device 120 (e.g., the laptop computer 32). The client-side gaming control application 58, operating in the laptop computer 32, reads the summary report 70 to obtain the username(s), score(s), and the bookmark 110 associated with the paused battlefield simulation application 100. The client-side gaming control application 58 then instructs the laptop computer 32 to execute the battlefield simulation application 100 from the software location identified by the bookmark 110. The client-side gaming control application 58 may also instruct the laptop computer 32 to resume scoring from the previous tally or score(s) contained in the summary report 70.

Here, then, resumption of play is not confined to the same device at which play was paused. Exemplary embodiments permit gaming applications to be paused and resumed from any gaming device. Gamers thus have complete freedom to roam between gaming devices and to resume play of electronic games without concern for manufacturer, room, or device compatibilities. The player no longer needs to carry or transport the same gaming device to resume play for different locations.

Figure 7:
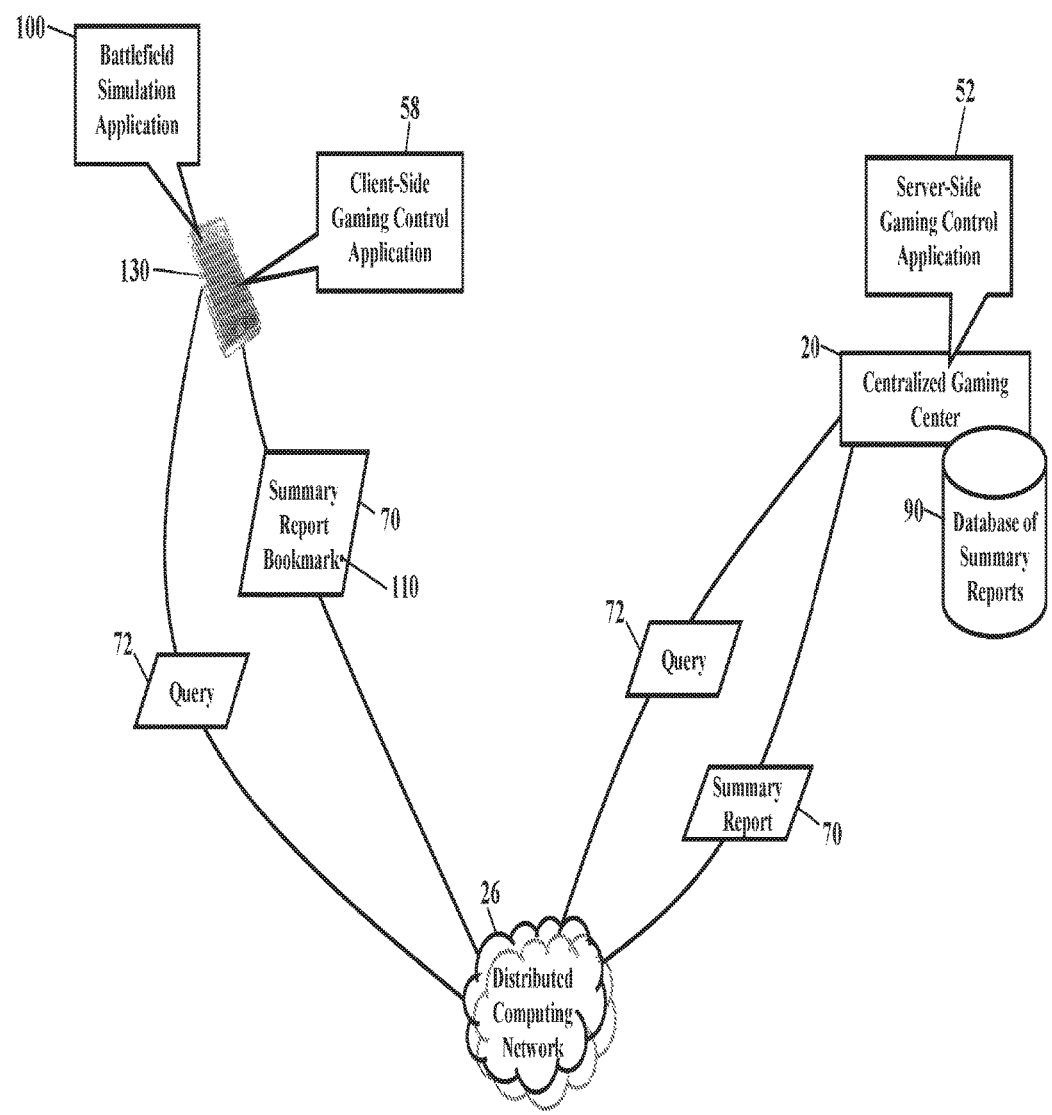
FIG. 7 is a schematic illustrating remote resumption of games, according to exemplary embodiments.

FIG. 7 is a schematic illustrating remote resumption of games, according to exemplary embodiments. Here electronic games may be resumed from any location. As FIG. 7 illustrates, the player-user may wish to resume play of the battlefield simulation application 100 at any different location, such as a friend's home, a coffee shop, or any networked location. As long as the user may remotely access the centralized gaming center 20, the user may resume gaming applications from any worldwide location. Suppose, for example, the user wishes to resume play of the battlefield simulation application 100 from a mobile communications device 130 (illustrated as an APPLE® IPHONE®) over the Internet. The user instructs the client-side gaming control application 58, operating in the mobile communications device 130, to send the query 72 to the centralized gaming center 20. The query 72 routes along the distributed computing network 26 (e.g., the Internet) to the network address associated with the centralized gaming center 20. The query 72, as before, may include information describing the paused battlefield simulation application 100. When the centralized gaming center 20 receives the query 72, the server-side gaming control application 52 queries the database 90 of summary reports for the summary report 70 associated with the username 74, the device identifier 76, the gaming identifier 78, and/or the session identifier 80 (as FIG. 3 illustrated). The corresponding summary report 70 is retrieved and sent back along the distributed computing network 26 to the network address associated with the user's APPLE® IPHONE®. The client-side gaming control application 58, operating in the mobile communications device 130 (the APPLE® IPHONE®), reads the summary report 70 and instructs the mobile communications device 130 to resume the battlefield simulation application 100 from the bookmark 110. The client-side gaming control application 58 also instructs the mobile communications device 130 to resume scoring from the previous tally or score(s) contained in the summary report 70.

Figure 8:
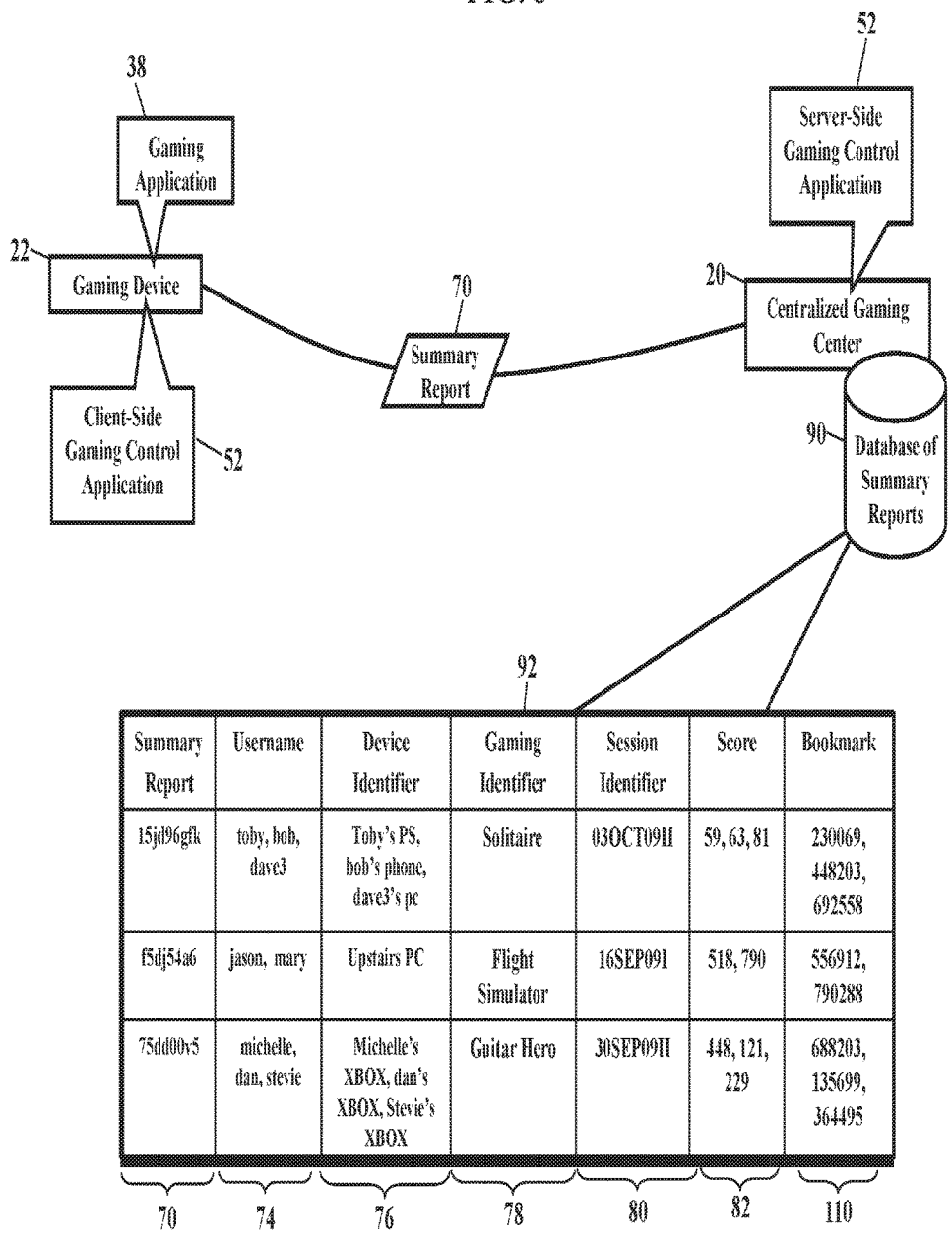
FIG. 8 is a schematic illustrating multiple bookmarks for multiple users, according to exemplary embodiments.

FIG. 8 is a schematic illustrating multiple bookmarks for multiple users, according to exemplary embodiments. Many gaming applications support multiple players; indeed, some games permit interactive, simultaneous play by multiple users. Exemplary embodiments, then, permit pausing and resumption of games having multiple players. When any player requests a pause, exemplary embodiments may bookmark the requesting player's position in the game. Any player may then resume play from any gaming device, without disrupting the play of other players.

FIG. 8 illustrates the summary report 70 for multiple player games. When the gaming application 38 is initiated, the client-side gaming control application 58 may initially create the summary report 70. The summary report 70 may list the multiple usernames 74 associated with the gaming identifier 78 and/or the session identifier 80. The summary report 70 may also list multiple device identifiers 76, with each device identifier 76 associated with a different username 74. If the multiple players are all playing the electronic game on the same gaming device 22, then each username 74 may be associated with the same device identifier 76 (such as summary report "f5dj54a6" illustrated in FIG. 8). As each player plays the game, the client-side gaming control application 58 may also update the bookmarks 110 in the summary report 70. Each username 74, in other words, may have a correspondingly unique bookmark 110 describing each player's logical location 112 in the gaming application 38. The client-side gaming control application 58 may then periodically communicate updated summary reports 70 to the centralized gaming center 20. The client-side gaming control application 58 stores each successive summary report 70 in the database 90 of summary reports.

Any player may pause. When a player wishes to pause the gaming application 38, play may be paused for a single player, for multiple players, or for all players. If a single player wishes to pause play, then the summary report 70 may contain a static bookmark 110 for the pausing username 74. The usernames 74 that continue playing may have their respective bookmarks 110 dynamically updated in the summary report 70. If less than all players wish to pause, then the summary report 70 may contain static bookmarks 110 for the pausing usernames 74 and dynamic bookmarks 110 for the usernames that continue playing. If all players pause, then the summary report 70 may contain static bookmarks 110 for each username 74.

Any player may also resume play. When a player wishes to resume the gaming application 38, the player's gaming device 22 retrieves the summary report 70 associated with the player's username 74. The player's gaming device 22 queries the database 90 of summary reports for the summary report 70 associated with the player's username 74. The player's gaming device 22 retrieves the summary report 70 and the corresponding bookmark 110 associated with the player's username 74. The player's gaming device 22 may then resume execution of the gaming application 38 from the bookmark 110 associated with the player's username 74. So, whether play is resumed at the same device, or at a different device, the bookmark 110 allows the same username 74 to resume play from the logical location 112 at which the username 74 previously paused the gaming application 38. Players may thus pause-and-resume (or "come and go") from different gaming devices in different locations. Players need not pause-and-resume using the same gaming device 22.

Figure 9:
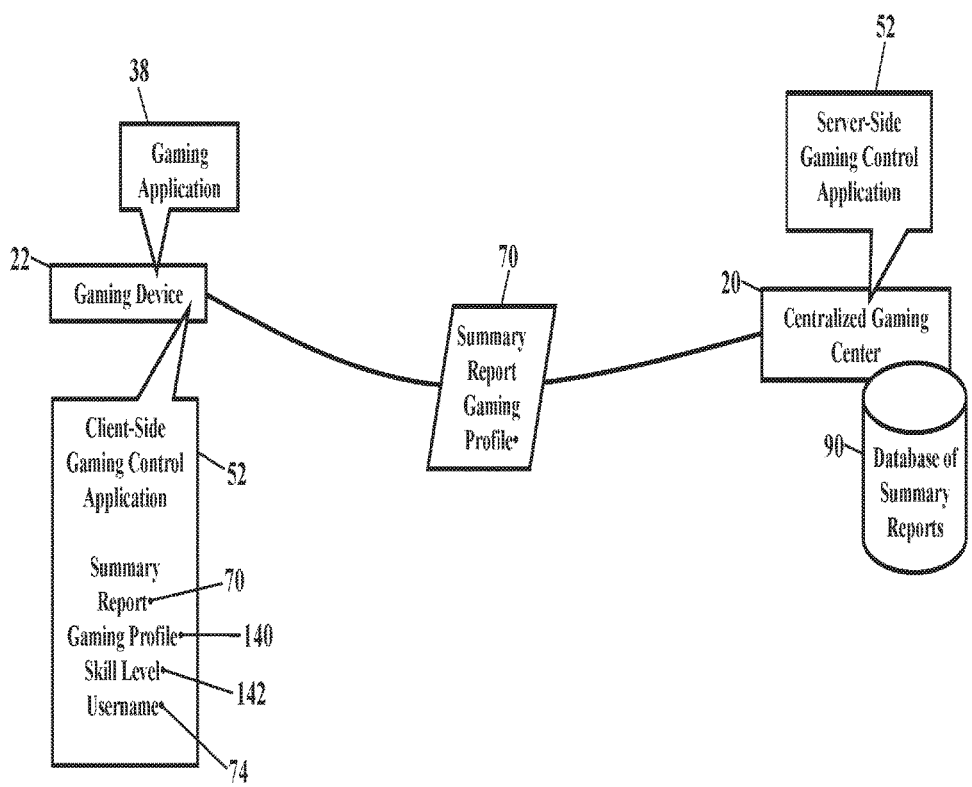
FIG. 9 is a schematic illustrating gaming profiles, according to exemplary embodiments.

FIG. 9 is a schematic illustrating gaming profiles, according to exemplary embodiments. Here exemplary embodiments create a standardized profile 140 for all gaming applications 38. When a user pauses, exits, or resumes the gaming application 38, the client-side gaming control application 58 creates the standardized gaming profile 140 using a common, industry-accepted standard format. The gaming profile 140 includes information that describes roles, characteristics, formats, and event a skill level 142 attained by the player's username 74. The gaming profile 140 may be stored with, merged with, or associated with the summary report 70. The client-side gaming control application 58, for example, includes the gaming profile 140 with the summary report 70 that is communicated to the centralized gaming center 20. When the same username 74 queries for the summary report 70, the gaming profile 140 is returned to the requesting device identifier 76.

The gaming profile 140 may then be used to configure different gaming applications 38. When the player's username 74 plays a different electronic game, the client-side gaming control application 58 may configure the different electronic game to the same gaming profile 140. The gaming profile 140 may thus be used to maintain or preserve a consistent "look and feel" of characters and scenes in all gaming applications, according to the player's desires. The gaming profile 140, for example, may be used to similarly configure a main character in any gaming application to same sex, hair color, size, clothing, or other physical attributes. The player establishes preferences in the gaming profile 140, and those preferences may be applied or carried forward to other gaming applications that access the gaming profile 140. Scenes and/or locations may even be consistent across gaming applications, as defined by the gaming profile 140. The user's racing car, for example, may be configured in any racing simulation to have the same manufacturer, model, colors, driver, and performance characteristics, as defined by the gaming profile 140. The player's preferred weapons, likewise, may be the same across different gaming applications. Love interests may be configured the same (physical description, personality, and skills) across different gaming applications, as defined by the gaming profile 140.

The gaming profile 140 may even be applied for consistent skill levels. When a player attains a particular skill level 142 in one gaming application, that same skill level 142 may be applied to other gaming applications. Suppose a player attains an advanced skill level in a flight simulator. The advanced skill level may then be stored in the gaming profile 140. When the same player's username 74 initiates another, different flight simulator application, then the gaming profile 140 may cause the different flight simulator application to be initially configured to the same advanced skill level. Skill levels, though, may be applied to diverse gaming applications. A user who is an "expert" warrior in one gaming application, for example, may want WIT® bowling, karate, and tennis applications configured to the same "expert" level. A proficient gamer, then, need not begin a new gaming application at a novice or beginner level. The gaming profile 140 may even store credentials that are recognized across gaming applications, such as points, character skills, and experiences.

Figure 10:
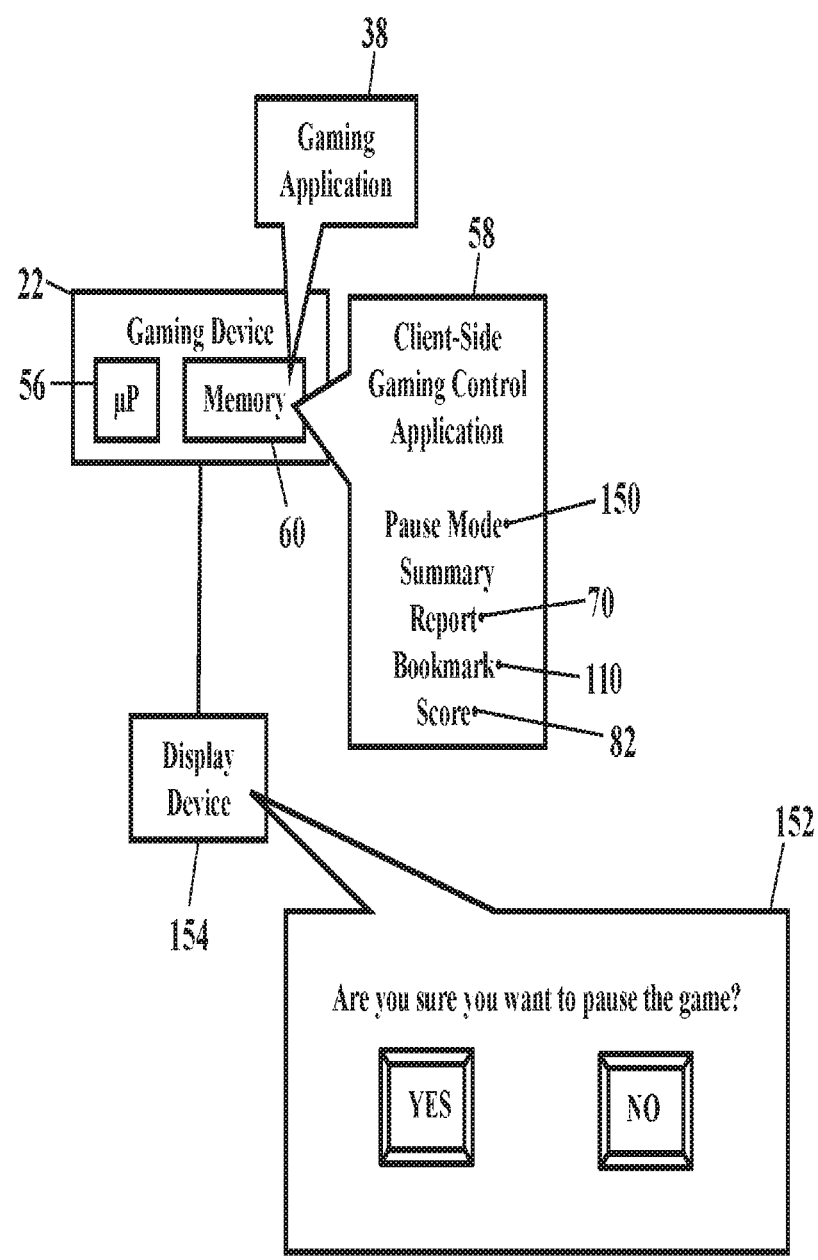
FIG. 10 is a schematic illustrating a graphical user interface for pausing gaming applications, according to exemplary embodiments.

FIG. 10 is a schematic illustrating a graphical user interface for pausing gaming applications, according to exemplary embodiments. When a player-user decides to pause the gaming application 38, the player-user may select a "pause play" icon, command, or control button in the gaming application 38. The selection causes the client-side gaming control application 58, operating in the gaming device 22, to enter a pause mode 150 of operation. During the pause mode 150 of operation, the client-side gaming control application 58 may cause the processor 56 to produce a pause graphical user interface 152. The pause graphical user interface 152 is illustrated as being visually produced on a display device 154, yet the pause graphical user interface 152 may also have audible features. Regardless, the pause graphical user interface 152 may prompt the player to confirm pausing of the gaming application 38. If pausing is confirmed, then the client-side gaming control application 58 may create or update the summary report 70 to reflect the pausing player's current score 82, the bookmark 110, and other game information. The client-side gaming control application 58 then sends the summary report 70 to the centralized gaming center 20, as earlier paragraphs explained.

Figure 11:
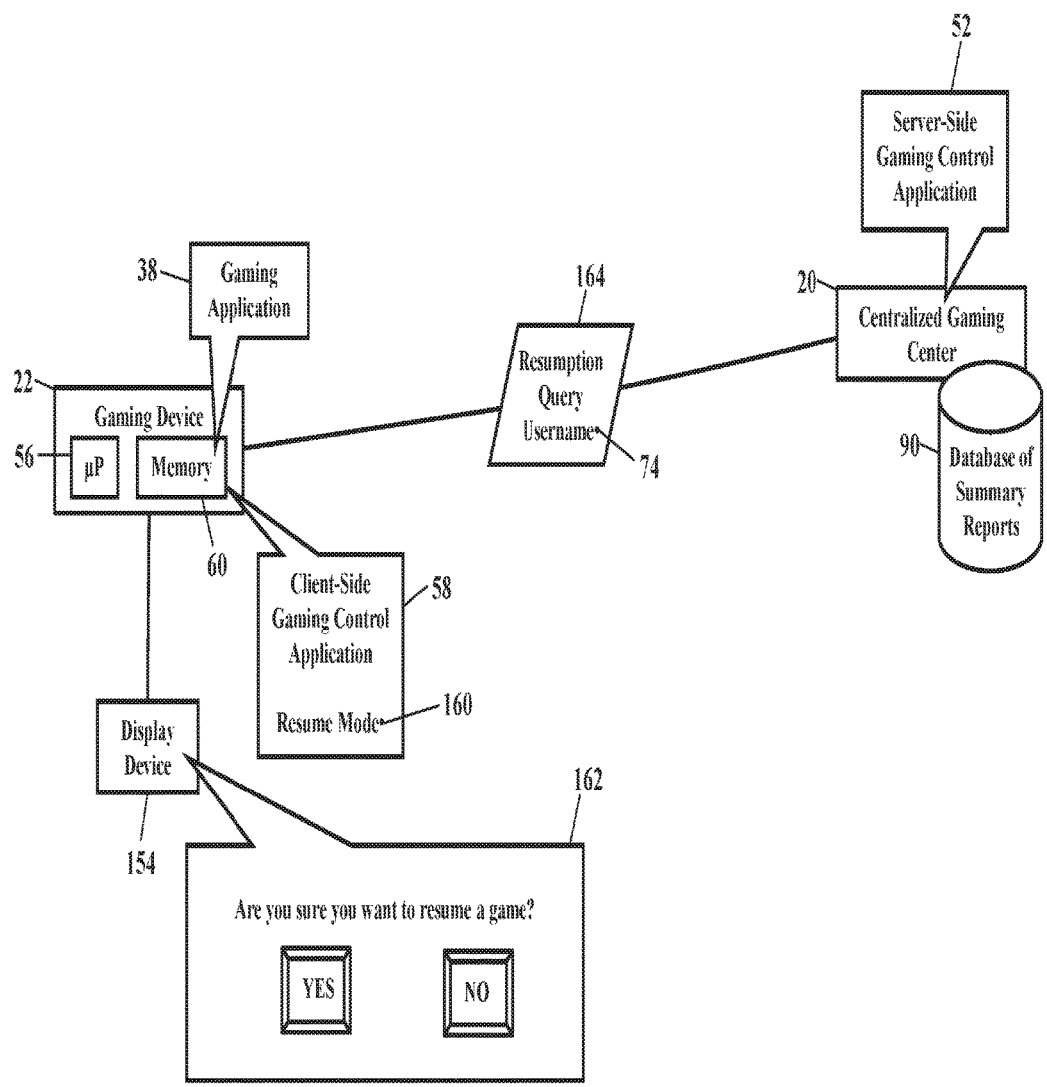
FIGS. 11-13 are schematics illustrating resumption of gaming applications, according to exemplary embodiments.
Figure 12:
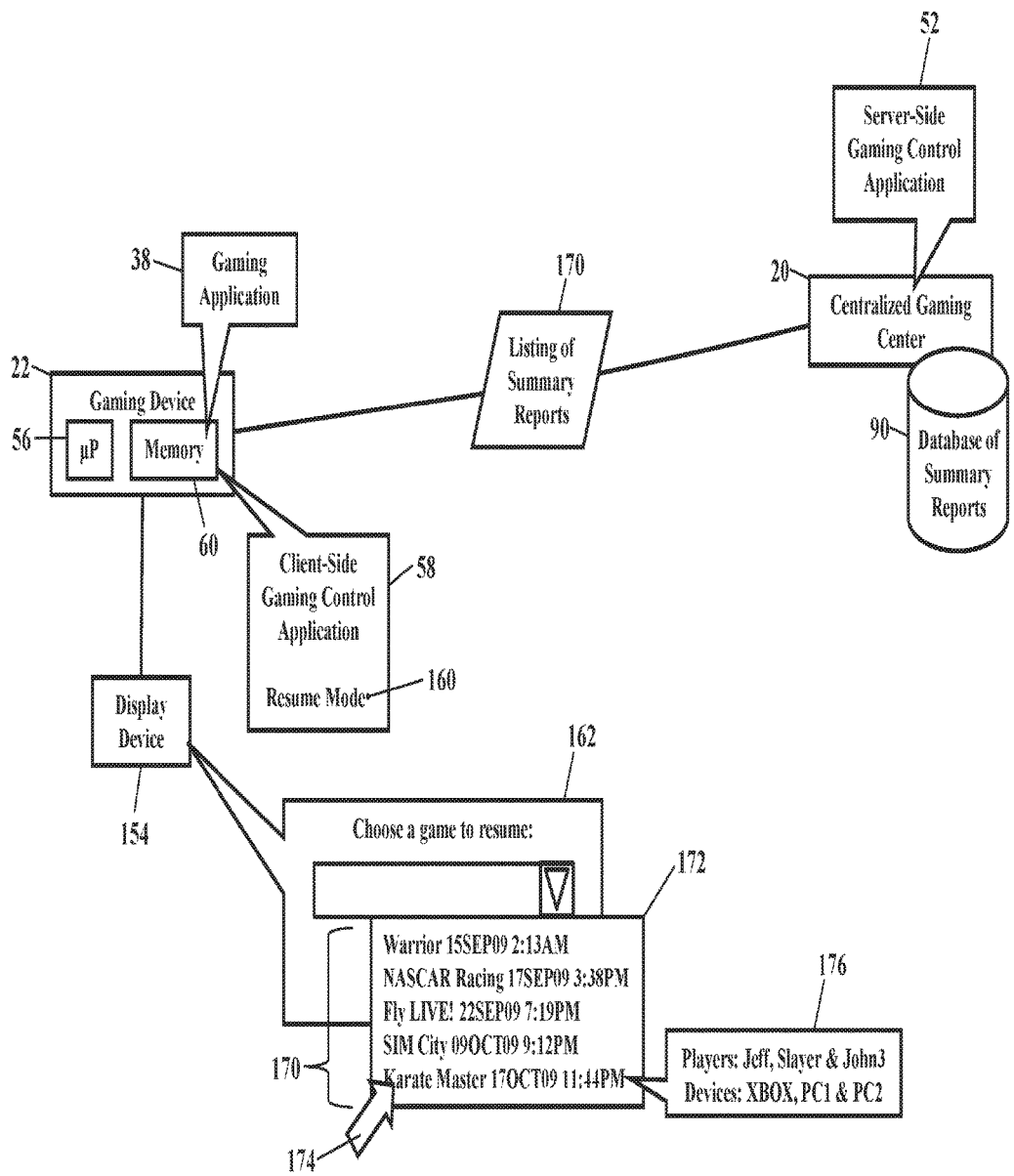
Figure 13:
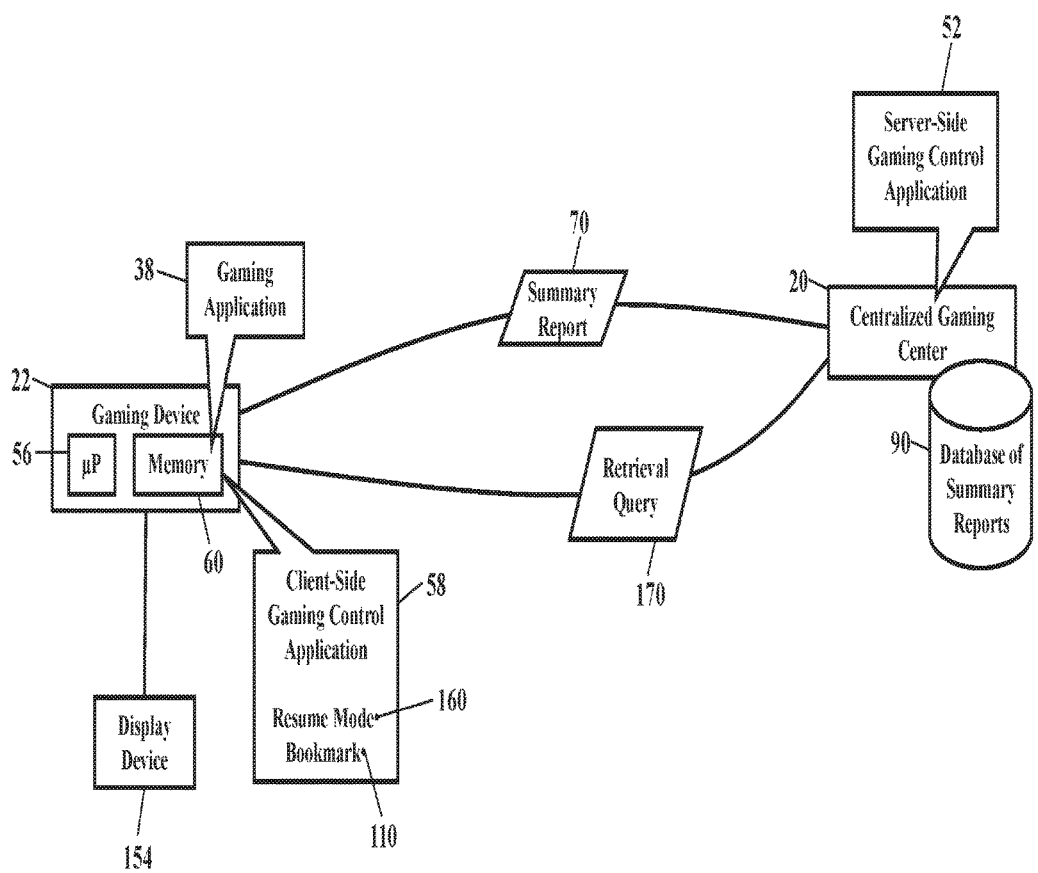

FIGS. 11-13 are schematics illustrating resumption of gaming applications, according to exemplary embodiments. When the player-user wishes to resume play of the previously-paused gaming application 38, the player-user selects a "resume play" icon, command, or control button in the gaming application 38. The selection causes the client-side gaming control application 58 to enter a resume mode 160 of operation. The client-side gaming control application 58 may cause the processor 56 to produce a resume graphical user interface 162 on the display device 154. The resume graphical user interface 162 may prompt the player to confirm resumption of the gaming application 38. If resumption is confirmed, then the client-side gaming control application 58 may send a resumption query 164 to the centralized gaming center 20 (via the home communications network 24 and/or the distributed computing network 26 illustrated in FIG. 1). The resumption query 164 causers the server-side gaming application 38 to query the database 90 of summary reports for one, some, or all summary reports 70 associated with the player's username 74 (as FIG. 3 illustrated).

As FIG. 12 illustrates, the centralized gaming center 20 then responds. The server-side gaming control application 52 retrieves a listing 170 of summary reports associated with the player's username 74. The client-side gaming control application 58 then causes the listing 170 of summary reports to be displayed in the resume graphical user interface 162. FIG. 12, for example, illustrates the listing 170 of summary reports as a drop-down menu 172. Each entry in the drop-down menu 172 may display the name of the paused game, a date that the game was paused, and even a time that the game was paused. This information may be stored and retrieved from the database 90 of summary reports. The player-user then selects the desired summary report 70 for which resumption of play is desired. A cursor 174 may be placed on the desired summary report 70, yet any other selection process is applicable. As FIG. 12 illustrates, the resuming player may also obtain more detailed information to help select the desired summary report 70. The user, for example, may right-click or otherwise make a selection to obtain more detailed game information 176. The detailed game information 176 lists information that helps differentiate the summary reports 70. The detailed game information 176 may list the usernames that played the paused game and each username's associated gaming device. The detailed game information 176 may additionally or alternatively list each username's score.

FIG. 13 illustrates retrieval of the desired summary report 70. Once the player has selected the desired summary report 70 from the drop-down menu (illustrated as reference numeral 172 in FIG. 12), the client-side gaming control application 58 may send a retrieval query 72 to the centralized gaming center 20 (via the home communications network 24 and/or the distributed computing network 26 illustrated in FIG. 1). The retrieval query 72 includes information that describes the desired summary report 70 from the drop-down menu 172. The server-side gaming application 38 queries the database 90 of summary reports and retrieves the desired summary report 70 for which resumption of play is desired. The server-side gaming application 38 sends the desired summary report 70 to the communications address (such as the Internet Protocol address) associated with the player's gaming device 22. The client-side gaming control application 58 reads the summary report 70 and instructs the gaming device 22 to resume the gaming application 38 from the bookmark 110. The client-side gaming control application 58 may also instruct the gaming console 36 to resume scoring from the previous tally or score(s) contained in the summary report 70.

Figure 14:
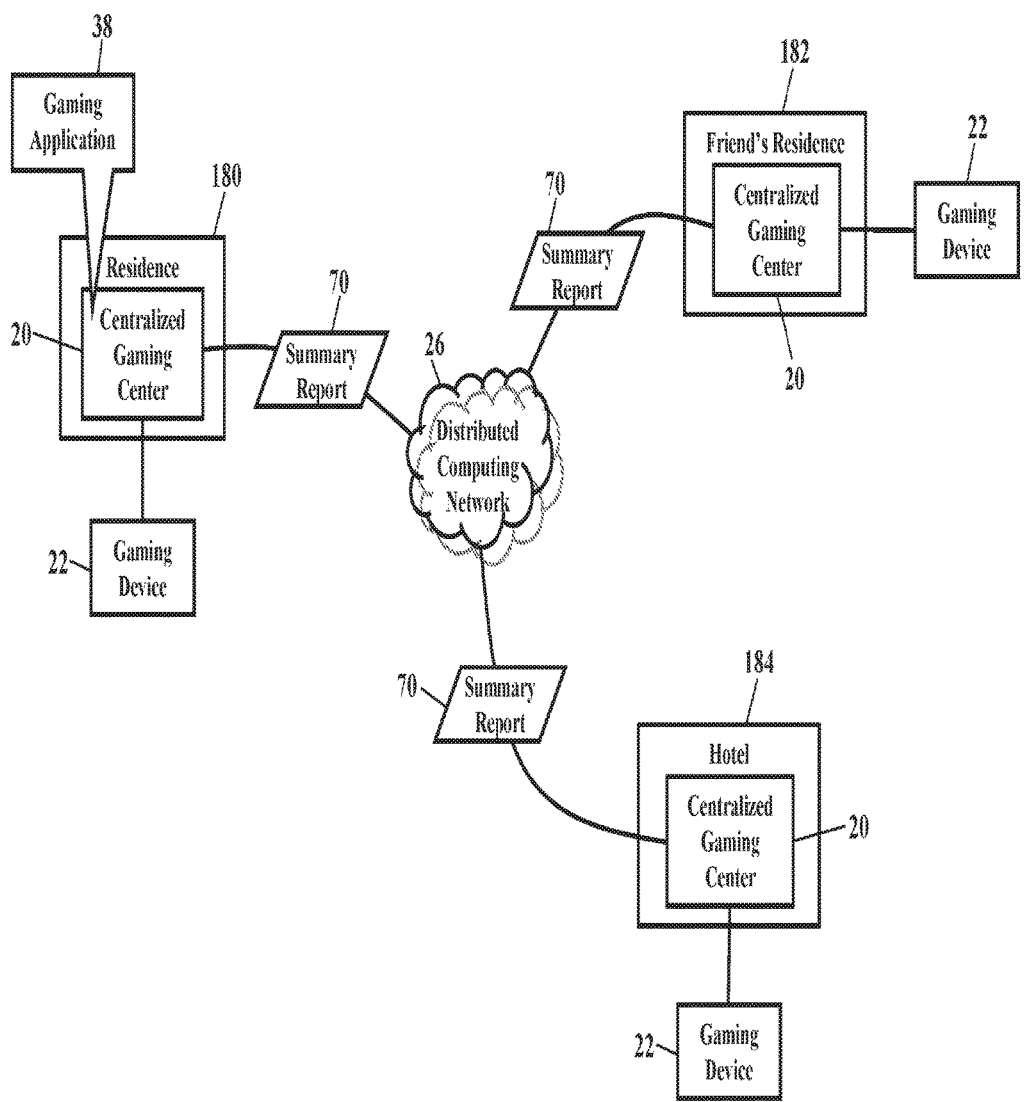
FIG. 14 is a schematic illustrating multiple, networked centralized gaming centers, according to exemplary embodiments.

FIG. 14 is a schematic illustrating multiple, networked centralized gaming centers 20, according to exemplary embodiments. Because the multiple centralized gaming centers 20 may all communicate via the distributed computing network 26, the summary report 70 may be shared with any gaming device 22 and/or with any networked centralized gaming center 20. As long as a player has access to the centralized gaming center 20 that stores the player's summary report 70, the player may play, pause, and resume play from any gaming device in the world. A player-user, for example, may pause play in their home and save the summary report 70 to their centralized gaming center 20 operating in the player's residence 180. The player-user may then travel to a friend's home 182, establish remote communication with the home-based centralized gaming center 20 from the friend's gaming device 22, and then resume play on the friend's gaming device 22. The player-user may even travel across the globe, establish remote communication with the home-based centralized gaming center 20, and resume play in a hotel 184, without carrying the gaming device. Friends and family may thus utilize the Internet to communicate with each other's respective centralized gaming centers 20, thus allowing real-time sharing of gaming experiences, as well as continuing saved/paused games between different devices and/or households.

FIG. 14 also illustrates multi-player games. The gaming application 38 may be hosted and executed by the centralized gaming center 20 operating in the player's residence 180. Multiple players, though, may remotely participate (such as from the from the friend's gaming device 22 in the friend's home 182 and from the gaming device 22 operating in the hotel 184). Conventional single source games split each player's display screen into quadrants for the active number of players. Exemplary embodiments, however, permit full-screen mode viewing for each remote player. The networked centralized gaming centers 20 permit multiple remote players, each with a different display device, to access the hosting centralized gaming center 20 operating in the player's residence 180. Each player has a full-screen view of the gaming application 38, without the quadrants. Conventional single source games historically required each player to have their own gaming console or pc, which then link together for the multi-player experience. Here, though, each player receives full-screen mode viewing, utilizing a single source (the centralized gaming center 20 operating in the player's residence 180), by networking the centralized gaming centers 20.

The centralized gaming center 20 and the gaming device 22 are only simply illustrated. Because the architecture and operating principles of processor-controlled devices are well known, their hardware and software components are not further shown and described. If the reader desires more details, the reader is invited to consult the following sources: ANDREW TANENBAUM, COMPUTER NETWORKS (4$^{th}$ edition 2003); WILLIAM STALLINGS, COMPUTER ORGANIZATION AND ARCHITECTURE: DESIGNING FOR PERFORMANCE (7$^{th}$ Ed., 2005); and DAVID A. PATTERSON & JOHN L. HENNESSY, COMPUTER ORGANIZATION AND DESIGN: THE HARDWARE/SOFTWARE INTERFACE (3$^{rd}$. Edition 2004).

Exemplary embodiments may be applied regardless of networking environment. The home communications network 24 and the distributed computing network 26 (illustrated in FIG. 1) may be a cable network operating in the radio-frequency domain and/or the Internet Protocol (IP) domain. The communications networks 24 and 26, however, may also include an intranet, a local-area network (LAN), and/or a wide-area network (WAN). The communications networks 24 and 26 may include coaxial cables, copper wires, fiber optic lines, and/or hybrid-coaxial lines. The communications networks 24 and 26 may even include wireless portions utilizing any portion of the electromagnetic spectrum and any signaling standard (such as the I.E.E.E. 802 family of standards, GSM/CDMA/TDMA or any cellular standard, BLUETOOTH®, WI-FI®, and/or the ISM band). The communications networks 24 and 26 may even include powerline portions, in which signals are communicated via electrical wiring. The concepts described herein may be applied to any wireless/wireline communications network, regardless of physical componentry, physical configuration, or communications standard(s).

Figure 15:
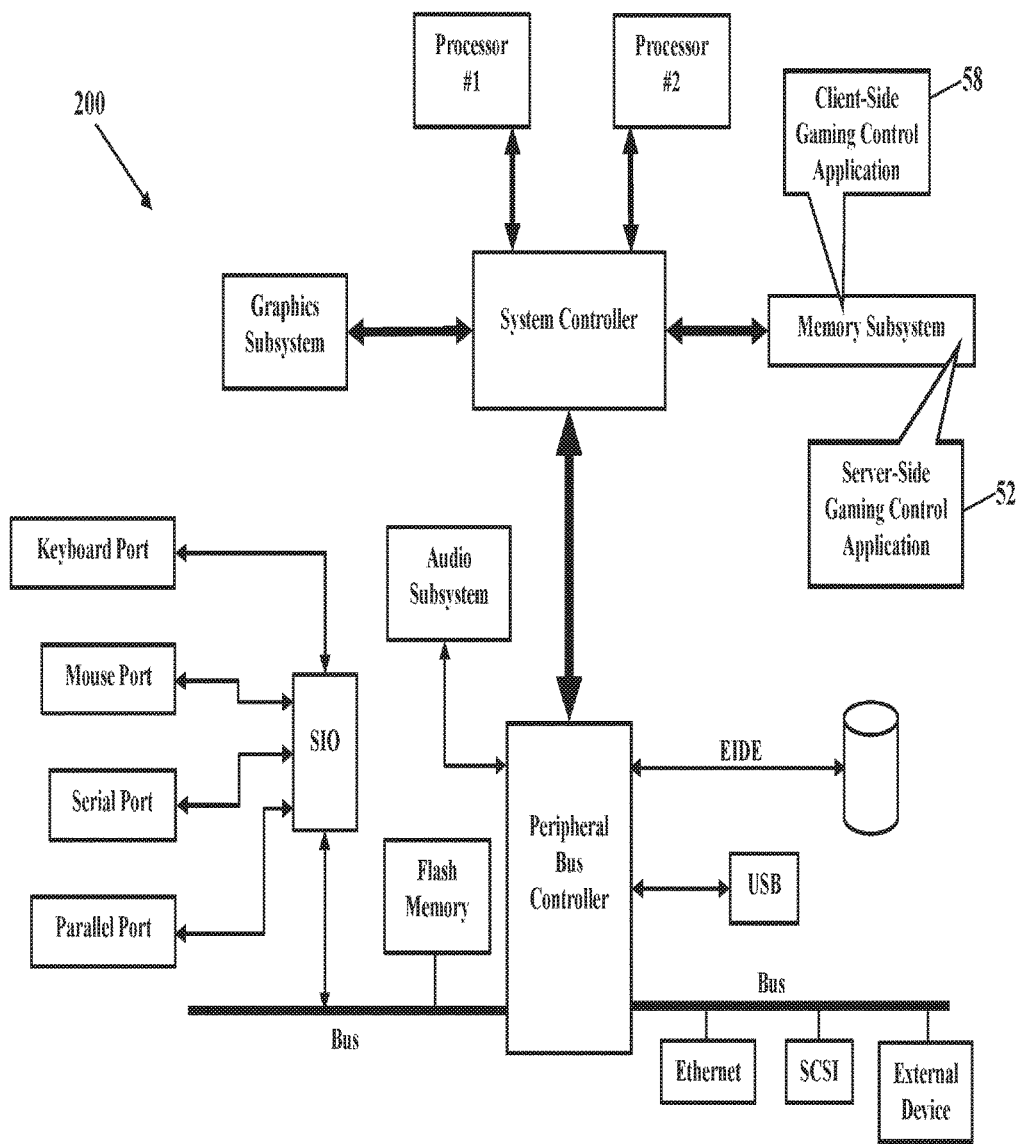
FIG. 15 is a schematic illustrating a block diagram of a processor-controlled device, according to exemplary embodiments.

FIG. 15 is a schematic illustrating still more exemplary embodiments. FIG. 15 is a generic block diagram illustrating the server-side gaming control application 52 and/or the client-side gaming control application 58 may operate within a processor-controlled device 200. The server-side gaming control application 52 and/or the client-side gaming control application 58 may be stored in a memory subsystem of the processor-controlled device 200. One or more processors communicate with the memory subsystem and execute the server-side gaming control application 52 and/or the client-side gaming control application 58. Because the processor-controlled device 200 illustrated in FIG. 15 is well-known to those of ordinary skill in the art, no detailed explanation is needed.

Figure 16:
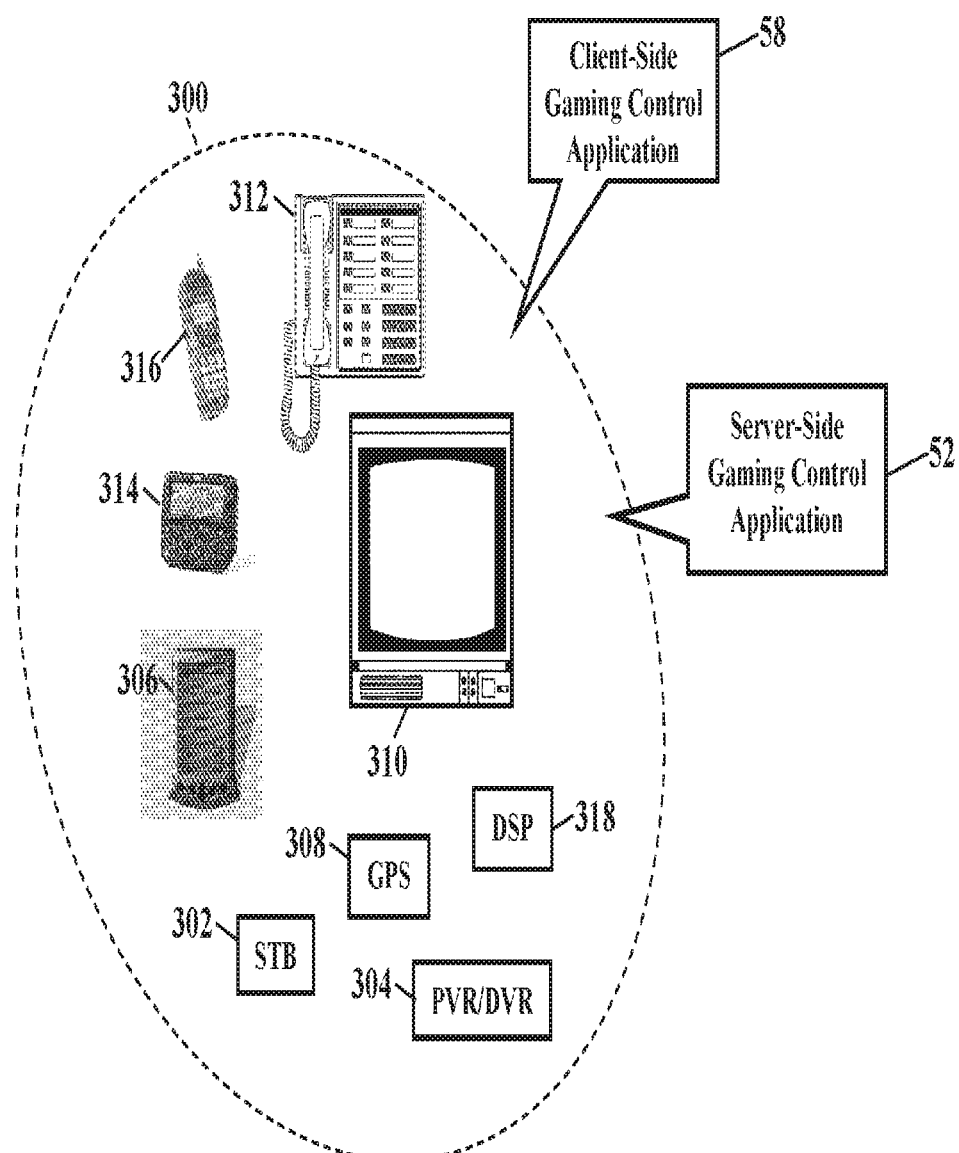
FIG. 16 depicts other possible operating environments for additional aspects of the exemplary embodiments.

FIG. 16 depicts other possible operating environments for additional aspects of the exemplary embodiments. FIG. 16 illustrates that the exemplary embodiments may alternatively or additionally operate within various other devices 300. FIG. 16, for example, illustrates that the server-side gaming control application 52 and/or the client-side gaming control application 58 may entirely or partially operate within a set-top box ("STB") (302), a personal/digital video recorder (PVR/DVR) 304, personal digital assistant (PDA) 306, a Global Positioning System (GPS) device 308, an interactive television 310, an Internet Protocol (IP) phone 312, a pager 314, a cellular/satellite phone 316, or any computer system, communications device, or processor-controlled device utilizing the processor 50 or 56 and/or a digital signal processor (DP/DSP) 318. The device 300 may also include watches, radios, vehicle electronics, clocks, printers, gateways, mobile/implantable medical devices, and other apparatuses and systems. Because the architecture and operating principles of the various devices 300 are well known, the hardware and software componentry of the various devices 300 are not further shown and described. If, however, the reader desires more details, the reader is invited to consult the following sources: LAWRENCE HARTE et al., GSM SUPERPHONES (1999); SIEGMUND REDL et al., GSM AND PERSONAL COMMUNICATIONS HANDBOOK (1998); and JOACHIM TISAL, GSM CELLULAR RADIO TELEPHONY (1997); the GSM Standard 2.17, formally known *Subscriber Identity Modules, Functional Characteristics* (GSM 02.17 V3.2.0 (1995-01))"; the GSM Standard 11.11, formally known as *Specification of the Subscriber Identity Module-Mobile Equipment (Subscriber Identity Module-ME) interface* (GSM 11.11 V5.3.0 (1996-07))"; MICHEAL ROBIN & MICHEL POULIN, DIGITAL TELEVISION FUNDAMENTALS (2000); JERRY WHITAKER AND BLAIR BENSON, VIDEO AND TELEVISION ENGINEERING (2003); JERRY WHITAKER, DTV HANDBOOK (2001); JERRY WHITAKER, DTV: THE REVOLUTION IN ELECTRONIC IMAGING (1998); and EDWARD M. SCHWALB, ITV HANDBOOK: TECHNOLOGIES AND STANDARDS (2004).

Figure 17:
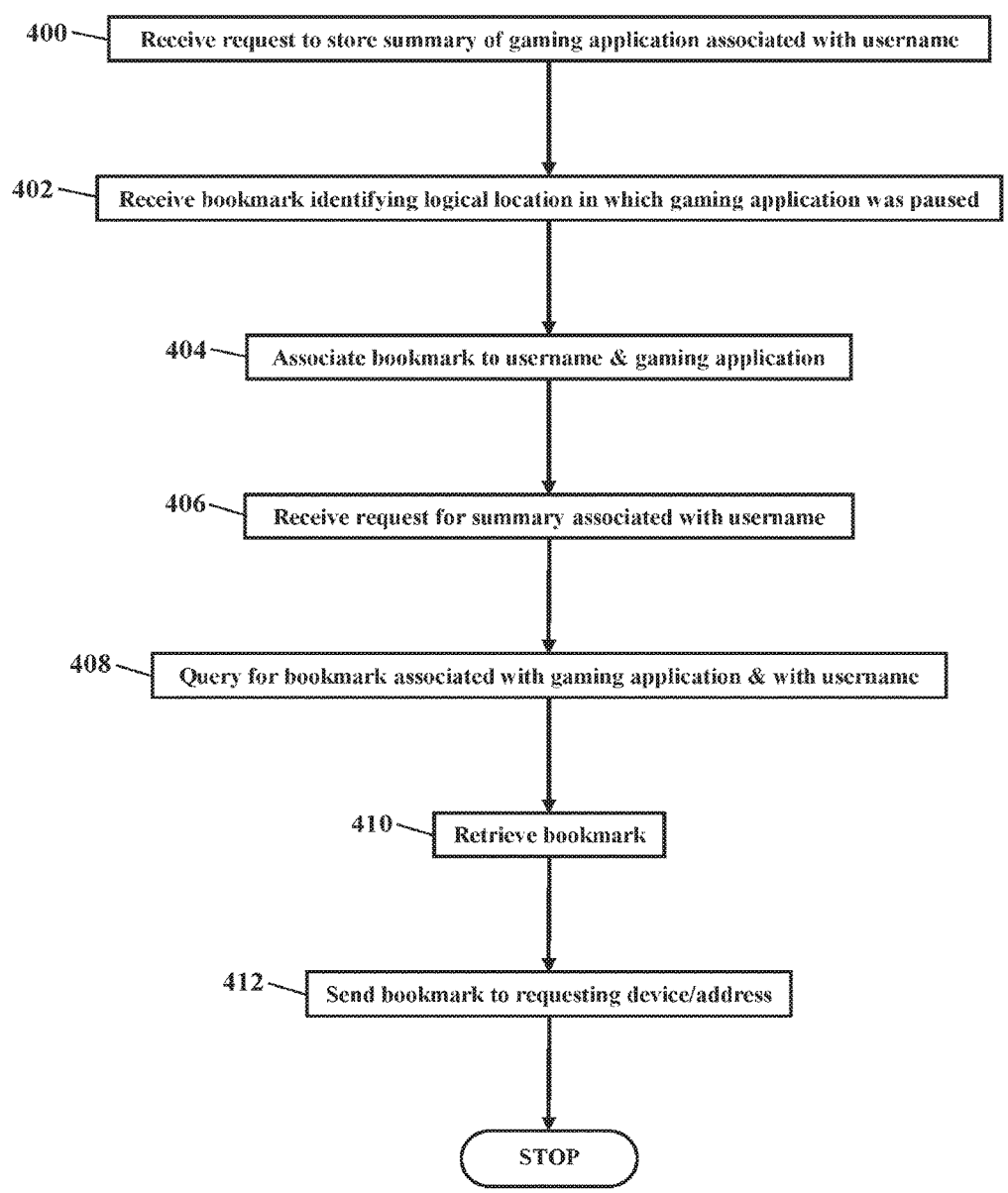
FIGS. 17-19 are flowcharts illustrating a method for centralized control of gaming applications, according to exemplary embodiments.

FIG. 17 is a flowchart illustrating a method for centralized control of gaming applications, according to exemplary embodiments. A request is received to store a summary of a gaming application associated with a username (Block 400). A bookmark is received that identifies a logical location in which the gaming application was paused (Block 402). The bookmark is associated to the username and to the gaming application (Block 404). Another request is then received for the summary of the gaming application associated with the username (Block 406). A query is made for the bookmark associated with the gaming application and with the username (Block 408). The bookmark is retrieved (Block 410) and send (Block 412) to a requesting device to resume the gaming application from the bookmark.

Figure 18:
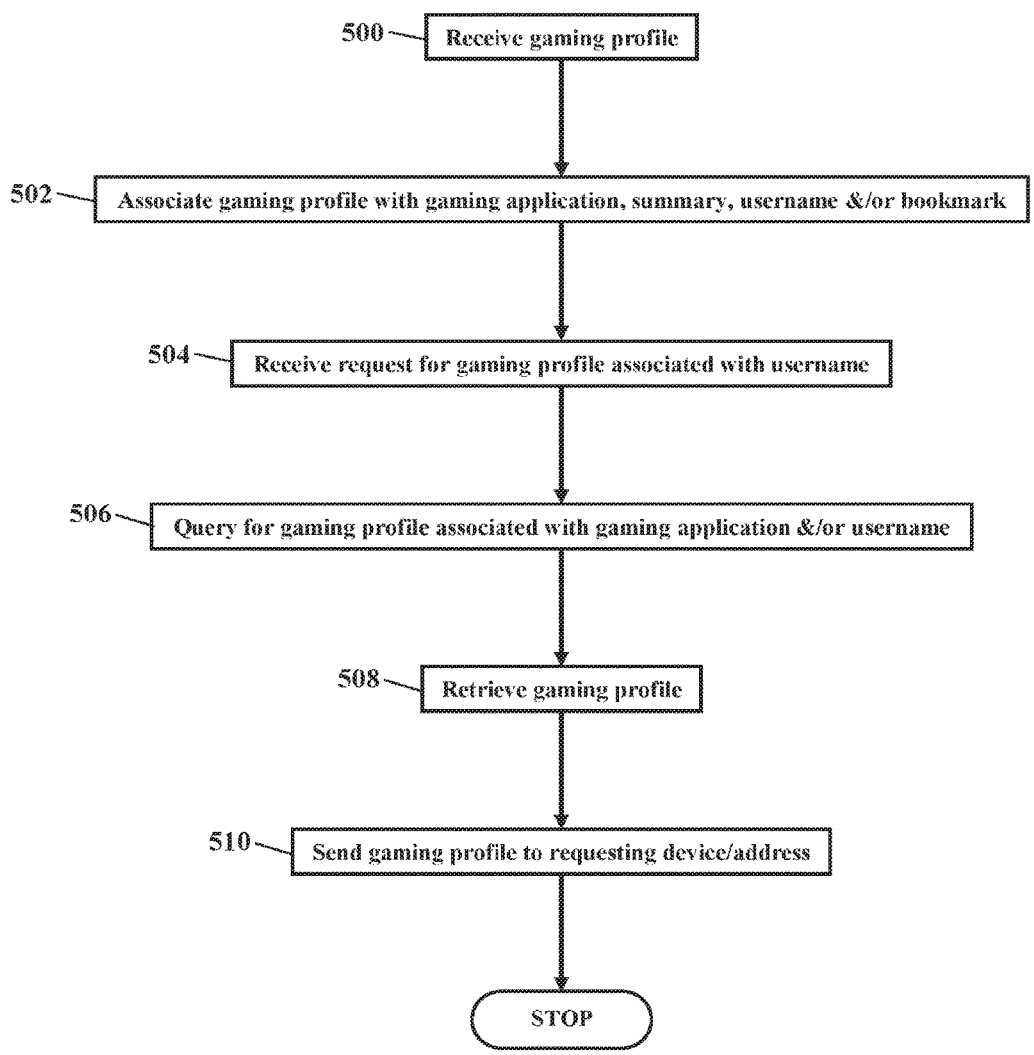

FIG. 18 is another flowchart illustrating the method for centralized control of gaming applications, according to exemplary embodiments. A gaming profile is received (Block 500) and associated to a username, gaming application, summary, and/or bookmark (Block 502). A request is received for the gaming profile associated with the username (Block 504), and a query is made (Block 506). The gaming profile is retrieved (Block 508) and send (Block 510) to a requesting device or address.

Figure 19:
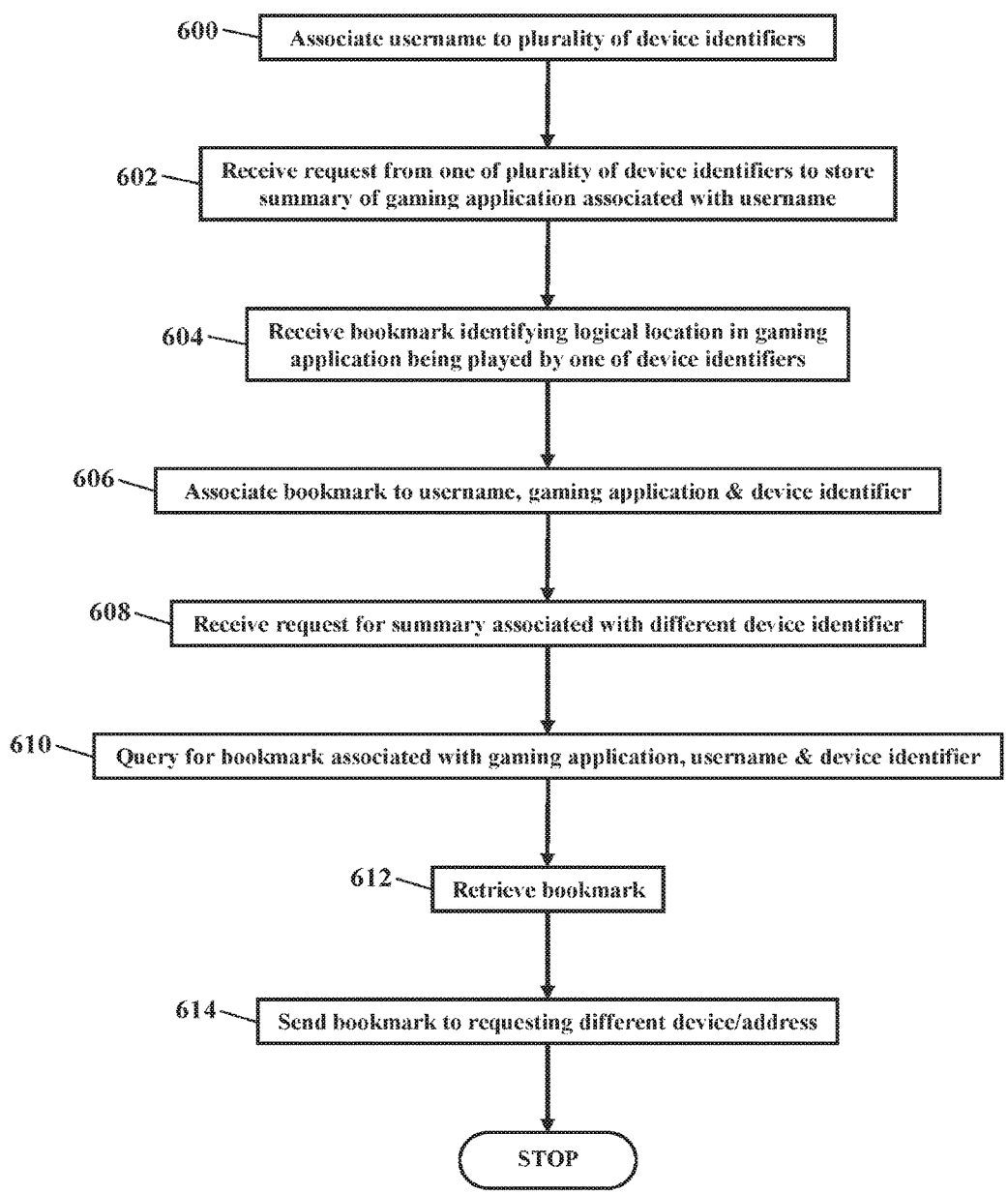

FIG. 19 is another flowchart illustrating the method for centralized control of gaming applications, according to exemplary embodiments. A username is associated to a plurality of device identifiers (Block 600). A request is received from one of the plurality of device identifiers to store a summary of a gaming application associated with the username (Block 602). A bookmark is received that identifies a logical location in the gaming application being played by the one of the plurality of device identifiers (Block 604). The bookmark is associated to the username, to the gaming application, and to the one of the plurality of device identifiers (Block 606). A request is received for the summary of the gaming application for the username and a different device identifier (Block 608). A query is made for the bookmark associated with the gaming application, with the username, and with the different device identifier (Block 610). The bookmark is retrieved (Block 612) and send (Block 614) to a different one of the plurality of device identifiers to resume the gaming application from the bookmark on a different device.

Exemplary embodiments may be physically embodied on or in a computer-readable storage medium. This computer-readable medium may include CD-ROM, DVD, tape, cassette, floppy disk, memory card, and large-capacity disks. This computer-readable medium, or media, could be distributed to end-subscribers, licensees, and assignees. These types of computer-readable media, and other types not mention here but considered within the scope of the exemplary embodiments. A computer program product comprises processor-executable instructions for centralized control of gaming applications.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:
1. A method comprising:
receiving an electronic request that requests resumption of a gaming software application;
querying an electronic database for an identifier, the electronic database having electronic associations between bookmarks and identifiers including the identifier;
retrieving a bookmark of the bookmarks from the electronic database, the bookmark identifying a location at which the gaming software application was previously paused; and
resuming the gaming software application from the location receiving, by a server, from a first gaming application executing on a first type gaming device in association with a username, a request to play the first gaming application;
accessing a profile associated with the username to obtain profile information stored in the profile;
providing the profile information to the first gaming application on the first type gaming device;
subsequently receiving, from a second gaming application executing on a second type gaming device in association with the username, a request to play the second gaming application, the second type gaming device being a different type of gaming device than the first type gaming device;
accessing the profile associated with the username to obtain the profile information stored in the profile; and
providing the profile information to the second gaming application executing on the second type gaming device.

2. The method of claim 1 wherein the first gaming application and the second gaming application are a same gaming application.

3. The method of claim 1 wherein the first gaming application and the second gaming application are different gaming applications.

4. The method of claim 1 wherein the profile information comprises a skill level associated with the username, and further comprising:
receiving data from the first gaming application executing on the first type gaming device related to the skill level;
updating the skill level in the profile to an updated skill level;
and wherein providing the profile information to the second gaming application executing on the second type gaming device comprises providing the updated skill level to the second gaming application executing on the second type gaming device.

5. The method of claim 4 wherein the first gaming application and the second gaming application are a same gaming application, and further comprising:
receiving, by the second gaming application executing on the second type gaming device, the updated skill level; and
initiating game play of the second gaming application based on the updated skill level.

6. The method of claim 4 wherein the first gaming application and the second gaming application are different gaming applications, and further comprising:
receiving, by the second gaming application executing on the second type gaming device, the updated skill level;
translating the updated skill level to a skill level associated with the second gaming application; and
initiating game play of the second gaming application based on the skill level associated with the second gaming application.

7. The method of claim 6 wherein the first gaming application is a flight simulator and the second gaming application is one of a bowling gaming application, a tennis gaming application, and a karate gaming application.

8. The method of claim 1 wherein the profile information identifies a visual characteristic of a character.

9. The method of claim 8 wherein the visual characteristic comprises one of a sex of the character, a hair color of the character, a size of the character, and a clothing of the character.

10. The method of claim 8 wherein the first gaming application and the second gaming application are different gaming applications, and further comprising:
  receiving, by the second gaming application executing on the second type gaming device, the profile information that identifies the visual characteristic of the character;
  automatically, without user input, configuring a character depicted by the second gaming application to have the visual characteristic; and
  depicting the character on a display device.

11. The method of claim 1 wherein the profile information identifies an automobile manufacturer and automobile model.

12. The method of claim 11 wherein the first gaming application and the second gaming application are different gaming applications, and further comprising:
  receiving, by the second gaming application executing on the second type gaming device, the profile information that identifies the automobile manufacturer and the automobile model;
  automatically, without user input, configuring an automobile depicted by the second gaming application to be the automobile model; and
  depicting the automobile on a display device.

13. The method of claim 1 wherein the profile information identifies a preferred weapon.

14. The method of claim 13 wherein the first gaming application and the second gaming application are different gaming applications, and further comprising:
  receiving, by the second gaming application executing on the second type gaming device, the profile information that identifies the preferred weapon; and
  automatically, without user input, configuring a default weapon used by a participant in the second gaming application to be the preferred weapon.

15. The method of claim 1 wherein the profile information identifies a location.

16. The method of claim 15 wherein the first gaming application and the second gaming application are different gaming applications, and further comprising:
  receiving, by the second gaming application executing on the second type gaming device, the profile information that identifies the location; and
  automatically, without user input, configuring an initial location depicted by the second gaming application to be the location.

17. The method of claim 1 wherein the first type gaming device is a gaming console device and the second type gaming device is a cellular phone.

18. The method of claim 1 wherein the first type gaming device is a gaming console device and the second type gaming device is a general purpose computing device.

19. A system comprising:
  a memory device; and
  a hardware processor device coupled to the memory device to:
  receive from a first gaming application executing on a first type gaming device in association with a username, a request to play the first gaming application;
  access a profile associated with the username to obtain profile information stored in the profile;
  provide the profile information to the first gaming application on the first type gaming device;
  subsequently receive, from a second gaming application executing on a second type gaming device in association with the username, a request to play the second gaming application, the second type gaming device being a different type of gaming device than the first type gaming device;
  access the profile associated with the username to obtain the profile information stored in the profile; and
  provide the profile information to the second gaming application executing on the second type gaming device.

20. A computer program product stored on a non-transitory computer-readable storage medium and including instructions to cause a processor device to:
  receive from a first gaming application executing on a first type gaming device in association with a username, a request to play the first gaming application;
  access a profile associated with the username to obtain profile information stored in the profile;
  provide the profile information to the first gaming application on the first type gaming device;
  subsequently receive, from a second gaming application executing on a second type gaming device in association with the username, a request to play the second gaming application, the second type gaming device being a different type of gaming device than the first type gaming device;
  access the profile associated with the username to obtain the profile information stored in the profile; and
  provide the profile information to the second gaming application executing on the second type gaming device.

* * * * *

UNITED STATES PATENT AND TRADEMARK OFFICE
CERTIFICATE OF CORRECTION

PATENT NO. : 10,155,163 B2
APPLICATION NO. : 15/798942
DATED : December 18, 2018
INVENTOR(S) : Jason Godfrey et al.

It is certified that error appears in the above-identified patent and that said Letters Patent is hereby corrected as shown below:

In the Claims

On Column 14, Lines 2-16, replace:
"A method comprising: receiving an electronic request that requests resumption of a gaming software application; querying an electronic database for an identifier, the electronic database having electronic associations between bookmarks and identifiers including the identifier; retrieving a bookmark of the bookmarks from the electronic database, the bookmark identifying a location at which the gaming software application was previously paused; and resuming the gaming software application from the location receiving, by a server, from a first gaming application executing on a first type gaming device in association with a username, a request to play the first gaming application;"
With:
--"1. A method comprising: receiving, by a server, from a first gaming application executing on a first type gaming device in association with a username, a request to play the first gaming application;"--.

Signed and Sealed this
Eleventh Day of February, 2020

Andrei Iancu
*Director of the United States Patent and Trademark Office*